United States Patent
Zhang et al.

(10) Patent No.: US 11,445,482 B2
(45) Date of Patent: Sep. 13, 2022

(54) METHOD AND DEVICE USED IN WIRELESS COMMUNICATION NODES

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 151 days.

(21) Appl. No.: 17/078,116

(22) Filed: Oct. 23, 2020

(65) Prior Publication Data

US 2021/0045094 A1  Feb. 11, 2021

Related U.S. Application Data

(63) Continuation of application No. PCT/CN2019/103347, filed on Aug. 29, 2019.

(30) Foreign Application Priority Data

Sep. 10, 2018  (CN) .......................... 201811051220.1

(51) Int. Cl.
  *H04W 72/04*   (2009.01)
  *H04W 4/40*    (2018.01)
  *H04L 5/00*    (2006.01)

(52) U.S. Cl.
  CPC .......... *H04W 72/04* (2013.01); *H04L 5/0007* (2013.01); *H04W 4/40* (2018.02)

(58) Field of Classification Search
  CPC .......... H04W 72/04; H04W 4/40; H04L 5/007
  See application file for complete search history.

(56) References Cited

U.S. PATENT DOCUMENTS

2013/0044722 A1   2/2013   Kang et al.
2018/0098295 A1*  4/2018   Reial .................... H04W 48/10

FOREIGN PATENT DOCUMENTS

CN   101252783 A   8/2008
CN   101257369 A   9/2008
(Continued)

OTHER PUBLICATIONS

ISR in application PCT/CN2019/103347 dated Oct. 17, 2019.
(Continued)

*Primary Examiner* — Shukri Taha

(57) ABSTRACT

The present disclosure provides a method and device used in wireless communication nodes. A first node receives a first radio signal; and transmits a first-type signaling on a first radio resource, the first-type signaling being used for indicating that the first radio signal is correctly received; or, transmits a second-type signaling on a second radio resource, the second-type signaling being used for indicating that the first radio signal is not correctly received; herein, time-domain resources occupied by the first radio resource and time-domain resource occupied by the second radio resources are orthogonal. Under Groupcast communication mode, the present disclosure transmits a retransmission signal to a UE that not correctly receives a radio signal through a UE that correctly receives a radio signal in the group, so as to achieve the purpose of improving signal received quality and resource utilization efficiency.

20 Claims, 15 Drawing Sheets

(56) References Cited

FOREIGN PATENT DOCUMENTS

| | | |
|---|---|---|
| CN | 102340829 A | 2/2012 |
| CN | 103238289 A | 8/2013 |
| CN | 103916223 A | 7/2014 |
| CN | 104936189 A | 9/2015 |
| CN | 106877986 A | 6/2017 |
| CN | 108173829 A | 6/2018 |
| WO | 2017010761 A1 | 1/2017 |

OTHER PUBLICATIONS

1st Office Action received in applicant No. 201811051220.1 dated Jul. 30, 2020.
2nd Office Action received in applicant No. 201811051220.1 dated Oct. 13, 2020.
Search Report received in applicant No. 201811051220.1 dated Jul. 24, 2020.

* cited by examiner

METHOD AND DEVICE USED IN WIRELESS COMMUNICATION NODES

CROSS REFERENCE TO RELATED APPLICATIONS

This application is a continuation of International Application No. PCT/CN2019/103347, filed Aug. 29, 2019, claims the priority benefit of Chinese Patent Application No. 201811051220.1, filed on Sep. 10, 2018, the full disclosure of which is incorporated herein by reference.

BACKGROUND

Technical Field

The present disclosure relates to transmission methods and devices in wireless communication systems, and in particular to a transmission scheme and device in wireless communications related to Sidelink, multi-antenna, and bandwidth.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. Besides, 3GPP RAN #80 plenary session has started an NR-based V2X technical research.

SUMMARY

To meet emerging traffic requirements, an NR V2X system is an updated version of the LTE V2X system, featuring higher throughput and reliability, lower latency, more distant communications with more precise positioning, and larger packet size and more various transmission period, as well as key technical features more compatible with the current 3GPP and non-3GPP techniques. The current working model of LTE V2X system is limited to Broadcast transmissions. While the NR V2X will study a technical scheme supporting multiple working models as Unicast, Groupcast and Broadcast according to consensus reached at 3GPP RAN #80 plenary session.

Under the current LTE D2D/V2X working model, a radio signal transmitted by a User Equipment (UE) via a Sidelink communication is Broadcast instead of being targeted at a certain specific UE, so that the UE will not feed Hybrid Automatic Repeat request-Acknowledgement/Negative Acknowledgment (HARQ-ACK/NACK) back to received information. When there exists a large data packet traffic targeted at a certain specific UE being transmitted through Broadcast working model, the resource utilization efficiency is very low and the transmission may not be guaranteed to be reliable.

In view of the above problem, the present disclosure discloses a solution for supporting a retransmission scheme under the Groupcast working model. When a UE transmits radio signals to a group of UEs, one part in the group receives correctly, while the other part does not receive correctly. Those UEs who do not receive correctly can initial a retransmission through those who receives correctly instead of only relying on a retransmission of the original UE, thus obtaining higher signal quality and better resource utilization efficiency. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred. Furthermore, though originally targeted at a retransmission scheme based on Groupcast, the present disclosure is also applicable to Broadcast and Unicast transmissions. Besides, the present disclosure is not only targeted at single-carrier communications, but also at multi-carrier communications.

The present disclosure provides a method in a first node for wireless communications, comprising:
   receiving a first radio signal; and
   transmitting a first-type signaling on a first radio resource, the first-type signaling being used for indicating that the first radio signal is correctly received; or, transmitting a second-type signaling on a second radio resource, the second-type signaling being used for indicating that the first radio signal is not correctly received;
   herein, time-domain resources occupied by the first radio resource and time-domain resources occupied by the second radio resource are orthogonal.

In one embodiment, a problem needed to be solved in the present disclosure is: in NR V2X system, when a UE A is in communication with a group of UEs, the original UE A needs to initiate a retransmission in the case that a UE B in this group does not receive correctly. Low channel quality from the UE A to the UE B and poor signal quality in a retransmission leads to that the retransmission cannot be correctly received, thus resulting in low resource utilization efficiency. The above method uses a UE who receives correctly in this group to select an idle UE C out of those UEs who receives correctly to transmit a retransmission signal to the UE B, thus improving signal quality, realizing efficient unitization of resources, and guaranteeing efficient transmissions of large data packets in V2X system.

In one embodiment, the above method is characterized in that a connection is created between a first-type signaling and a first radio resource.

In one embodiment, the above method is characterized in that a connection is created between a second-type signaling and a second radio resource.

In one embodiment, the above method is characterized in that a first radio resource and a second radio resource are orthogonal in time domain.

In one embodiment, the above method is characterized in that when a first radio signal is correctly received by a UE C which can provide a retransmission, a first-type signaling transmitted by the UE C comprises a radio resource (that is, a first radio resource) that can provide a retransmission.

In one embodiment, the above method is characterized in that when a first radio signal is not correctly received by a UE B, the UE B will monitor first-type signalings transmitted by other UEs in the group, and selects a radio resource (that is, a second radio resource) out of radio resources for retransmissions provided by other UEs to receive retransmission signals transmitted by other UEs.

In one embodiment, the above method is advantageous in that a retransmission signal can be transmitted by any UE who receives correctly in the group under the Groupcast working model, which reduces payload of the original UE and improves resource utilization efficiency.

According to one aspect of the present disclosure, the above method is characterized in comprising:

monitoring a second-type signaling on the second radio resource; and the second-type signaling being detected, transmitting a second radio signal on a third radio resource; or, the second-type signaling not being detected, dropping transmission of a second radio signal on the second radio resource;

herein, the first node transmits the first-type signaling on the first radio resource, a first bit block is used for generating the first radio signal, and the first bit block is used for generating the second radio signal.

According to one aspect of the present disclosure, the above method is characterized in that the first-type signaling transmitted by the first node is used for indicating the third radio resource.

According to one aspect of the present disclosure, the above method is characterized in that the second-type signaling comprises a first signature sequence.

According to one aspect of the present disclosure, the above method is characterized in comprising:

monitoring a first-type signaling on the first radio resource; and receiving a third radio signal on a fourth radio resource;

herein, the first node transmits the second-type signaling on the second radio resource, a first bit block is used for generating the first radio signal, and the first bit block is used for generating the third radio signal.

According to one aspect of the present disclosure, the above method is characterized in that the second-type signaling transmitted by the first node is used for indicating the fourth radio resource.

According to one aspect of the present disclosure, the above method is characterized in comprising:

detecting P candidate signalings on the first radio resource, each of the P candidate signalings indicating that the first radio signal is correctly received, and each of the P candidate signalings respectively indicating P identities, P being a positive integer greater than 1; and selecting the first-type signaling out of the P candidate signalings, and the selected first-type signaling being one of the P candidate signalings;

herein, the selected first-type signaling indicates a second identity, the second-type signaling transmitted by the first node indicates a second identity, the second identity being one of the P identities.

According to one aspect of the present disclosure, the above method is characterized in that the second-type signaling transmitted by the first node comprises an identity of a transmitter of the first radio signal.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

transmitting a first radio signal; and monitoring a first-type signaling on a first radio resource, or, monitoring a second-type signaling on a second radio resource;

herein, the first-type signaling is used for indicating that the first radio signal is correctly received, and the second-type signaling is used for indicating that the first radio signal is not correctly received; time-domain resources occupied by the first radio resource and time-domain resources occupied by the second radio resource are orthogonal.

According to one aspect of the present disclosure, the above method is characterized in comprising:

the second-type signaling being detected, transmitting a fourth radio signal on a fifth radio resource; or, the second-type signaling being not detected, dropping transmission of a fourth radio signal on the fifth radio resource;

herein, a first bit block is used for generating the first radio signal, and the first bit block is used for generating the third radio signal.

According to one aspect of the present disclosure, the above method is characterized in that the first radio signal comprises first control information, the first control information indicating the fifth radio resource.

According to one aspect of the present disclosure, the above method is characterized in that the second-type signaling comprises a first signature sequence.

According to one aspect of the present disclosure, the above method is characterized in that the second-type signaling detected by the second node is used for indicating the fifth radio resource.

According to one aspect of the present disclosure, the above method is characterized in comprising:

detecting P candidate signalings on the first radio resource, each of the P candidate signalings indicating that the first radio signal is correctly received, and each of the P candidate signalings respectively indicating P identities, P being a positive integer greater than 1; and selecting the first-type signaling out of the P candidate signalings, the first-type signaling being one of the P candidate signalings;

herein, the first-type signaling indicates a second identity, the second-type signaling monitored by the second node indicates a third identity, the third identity being one of the P identities.

According to one aspect of the present disclosure, the above method is characterized in that the second-type signaling detected by the second node comprises an identity of the second node, and the first-type signaling is not detected on the first radio resource.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first receiver: receiving a first radio signal; and a first transmitter: transmitting a first-type signaling on a first radio resource, the first-type signaling being used for indicating that the first radio signal is correctly received; or, transmitting a second-type signaling on a second radio resource, the second-type signaling being used for indicating that the first radio signal is not correctly received;

herein, time-domain resources occupied by the first radio resource and time-domain resources occupied by the second radio resource are orthogonal.

According to one aspect of the present disclosure, the above first node is characterized in comprising:

the first receiver monitoring a second-type signaling on the second radio resource; and the second-type signaling being detected by the first receiver, the first transmitter transmitting a second radio signal on a third radio resource; or, the second-type signaling not being detected by the first receiver, the first transmitter dropping transmission of a second radio signal on the third radio resource;

herein, the first node transmits the first-type signaling on the first radio resource, a first bit block is used for generating the first radio signal, and the first bit block is used for generating the second radio signal.

According to one aspect of the present disclosure, the above first node is characterized in that the first-type signaling transmitted by the first node is used for indicating the third radio resource.

According to one aspect of the present disclosure, the above first node is characterized in that the second-type signaling comprises a first signature sequence.

According to one aspect of the present disclosure, the above first node is characterized in comprising:

the first receiver monitoring a first-type signaling on the first radio resource; and the first receiver receiving a third radio signal on a fourth radio resource;

herein, the first node transmits the second-type signaling on the second radio resource, a first bit block is used for generating the first radio signal, and the first bit block is used for generating the third radio signal.

According to one aspect of the present disclosure, the above first node is characterized in that the second-type signaling transmitted by the first node is used for indicating the fourth radio resource.

According to one aspect of the present disclosure, the above first node is characterized in comprising:

the first receiver detecting P candidate signalings on the first radio resource, each of the P candidate signalings indicating that the first radio signal is correctly received, and each of the P candidate signalings respectively indicating P identities, P being a positive integer greater than 1; and the first receiver selecting the first-type signaling out of the P candidate signalings, and the selected first-type signaling being one of the P candidate signalings;

herein, the selected first-type signaling indicates a second identity, the second-type signaling transmitted by the first node indicates a second identity, the second identity being one of the P identities.

According to one aspect of the present disclosure, the above first node is characterized in that the second-type signaling transmitted by the first node comprises an identity of a transmitter of the first radio signal.

According to one aspect of the present disclosure, the above first node is characterized in that the first node is a UE.

According to one aspect of the present disclosure, the above first node is characterized in that the first node is a relay node.

The present disclosure provides a second node for wireless communications, comprising:

a second transmitter; transmitting a first radio signal; and a second receiver; monitoring a first-type signaling on a first radio resource, or, monitoring a second-type signaling on a second radio resource;

herein, the first-type signaling is used for indicating that the first radio signal is correctly received, and the second-type signaling is used for indicating that the first radio signal is not correctly received; time-domain resources occupied by the first radio resource and time-domain resources occupied by the second radio resource are orthogonal.

According to one aspect of the present disclosure, the above second node is characterized in comprising:

the second-type signaling being detected by the second receiver, and the second transmitter transmitting a fourth radio signal on a fifth radio resource; or, the second-type signaling not being detected by the second receiver, and the second transmitter dropping transmission of a fourth radio signal on the fifth radio resource;

herein, a first bit block is used for generating the first radio signal, and the first bit block is used for generating the third radio signal.

According to one aspect of the present disclosure, the above second node is characterized in that the first radio signal comprises first control information, the first control information indicating the fifth radio resource.

According to one aspect of the present disclosure, the above second node is characterized in that the second-type signaling comprises a first signature sequence.

According to one aspect of the present disclosure, the above second is characterized in that the second-type signaling detected by the second node is used for indicating the fifth radio resource.

According to one aspect of the present disclosure, the above second node is characterized in comprising:

the second receiver detecting P candidate signalings on the first radio resource, each of the P candidate signalings indicating that the first radio signal is correctly received, and each of the P candidate signalings respectively indicating P identities, P being a positive integer greater than 1; and the second receiver selecting the first-type signaling out of the P candidate signalings, and the first-type signaling being one of the P candidate signalings;

herein, the first-type signaling indicates a second identity, the second-type signaling monitored by the second node indicates a third identity, the third identity being one of the P identities.

According to one aspect of the present disclosure, the above second node is characterized in that the second-type signaling detected by the second node comprises an identity of the second node, and the first-type signaling is not detected on the first radio resource.

According to one aspect of the present disclosure, the above second node is characterized in that the second node is a UE.

According to one aspect of the present disclosure, the above second node is characterized in that the second node is a relay node.

In one embodiment, the present disclosure is advantageous in the following aspects:

A connection is created between a first-type signaling and a first radio resource.

A connection is created between a second-type signaling and a second radio resource.

A first radio resource and a second radio resource are orthogonal in time domain.

In the present disclosure, when a first radio signal is correctly received by a UE C which can provide a retransmission, a first-type signaling transmitted by the UE C comprises a radio resource (that is, a first radio resource) that can provide a retransmission.

In the present disclosure, when a first radio signal is not correctly received by a UE B, the UE B will monitor first-type signalings transmitted by other UEs in the group, and selects one radio resource (that is, a second radio resource) out of radio resources for retransmissions provided by other UEs for receiving retransmission signals transmitted by other UEs.

In the present disclosure, a retransmission signal can be transmitted by any UE who receives correctly in the group under the Groupcast working model, which reduces payload of the original UE and improves resource utilization efficiency.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Figure 1:
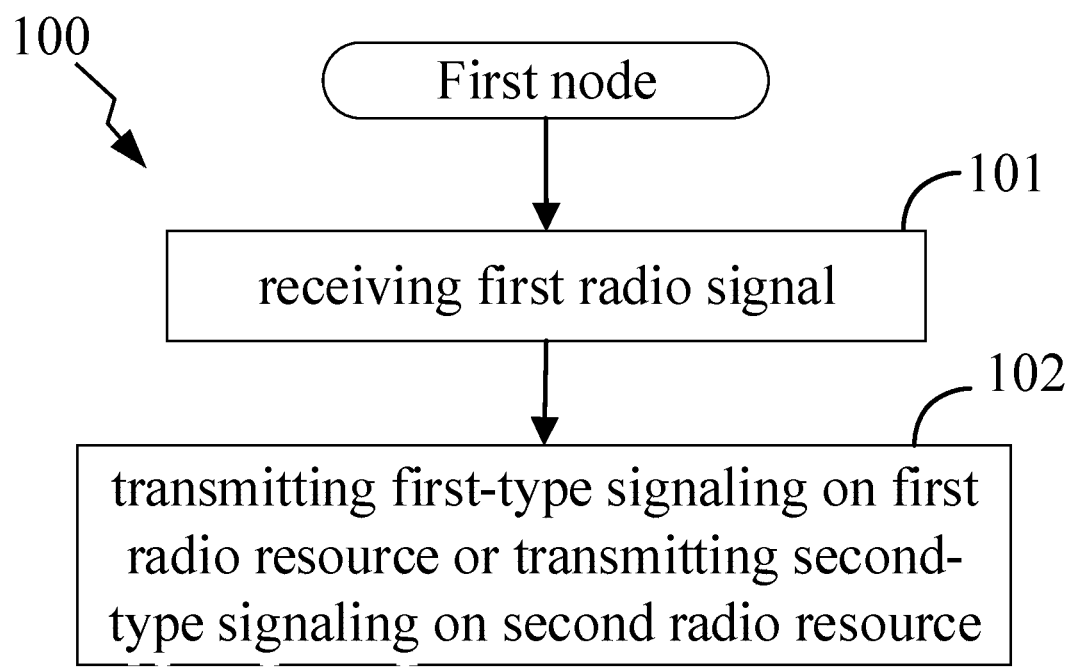
FIG. 1 illustrates a flowchart of transmissions of a first-type signaling, a second-type signaling and a first radio signal according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

The following definitions given in the present disclosure can be used in all embodiments in the present disclosure and characteristics of the embodiments:

A first-type channel comprises at least one of a Broadcast Channel (BCH), a Physical Broadcast Channel (PBCH), a Physical Downlink Control Channel (PDCCH), a Physical Downlink Shared Channel (PDSCH), a Narrowband Physical Broadcast Channel (NPBCH), a Narrowband Physical Downlink Control Channel (NPDCCH), and a Narrowband Physical Downlink Shared Channel (NPDSCH).

A second-type channel comprises at least one of a Physical Random Access Channel (PRACH), a Physical Uplink Control Channel (PUCCH), a Physical Uplink Shared Channel (PUSCH), a Narrowband Physical Random Access Channel (NPRACH), a Narrowband Physical Uplink Shared Channel (NPUSCH), and a Short Physical Uplink Control Channel (SPUCCH).

A third-type channel comprises at least one of a Sidelink Broadcast Channel (SL-BCH), a Physical Sidelink Broadcast Channel (PSBCH), a Physical Sidelink Discovery Channel (PSDCH), a Physical Sidelink Control Channel (PSCCH), and a Physical Sidelink Shared Channel (PSSCH).

A first-type signal comprises at least one of a Primary Synchronization Signal (PSS), a Secondary Synchronization Signal (SSS), a Synchronization Signal/Physical Broadcast Channel(SSB), a Narrowband Primary Synchronization Signal (NPSS), a Narrowband Secondary Synchronization Signal (NSSS), a Reference Signal (RS), a Channel State Information-Reference Signal (CSI-RS), a Downlink Demodulation Reference Signal (DL DMRS), a Discovery Signal (DS), a Narrowband Reference Signal(NRS), a Positioning Reference Signal (PRS), a Narrowband Positioning Reference Signal (NPRS), and a Phase-Tracking Reference Signal (PT-RS).

A second-type signal comprises at least one of a Preamble, an Uplink Demodulation Reference Signal (UL DMRS), a Sounding Reference Signal (SRS), and an UL Tracking Reference Signal (UL TRS).

A third-type signal comprises at least one of a Sidelink Synchronization Signal (SLSS), a Primary Sidelink Synchronization Signal (PSSS), a Secondary Sidelink Synchronization Signal (SSSS), a Sidelink Demodulation Reference Signal (SL DMRS), and a PSBCH Demodulation Reference Signal (PSBCH-DMRS).

In one embodiment, the third-type signal comprises a PSSS and an SSSS.

In one embodiment, the third-type signal comprises a PSSS, an SSSS and a PSBCH.

A first pre-processing comprises at least one of first-level scrambling, TB-level Cyclic Redundancy Check (CRC) Attachment, Channel Coding, Rate Matching, second-level scrambling, Modulation, Layer Mapping, Transform Precoding, Precoding, Mapping to Physical Resources, Baseband Signal Generation, and Modulation and Upconversion.

In one embodiment, the first precoding is sequentially first-level scrambling, TB-level Cyclic Redundancy Check (CRC) Attachment, Channel Coding, Rate Matching, second-level scrambling, Modulation, Layer Mapping, Transform Precoding, Precoding, Mapping to Physical Resources, Baseband Signal Generation, and Modulation and Upconversion.

A second preprocessing comprises at least one of TB-level CRC Attachment, Code Block Segmentation, CB-level CRC attachment, channel coding, rate matching, CB Concatenation, scrambling, modulation, layer mapping, antenna port mapping, Mapping to Virtual Resource Blocks, Mapping from Virtual to Physical Resource Blocks, baseband signal generation, and modulation and Upconversion.

In one embodiment, the second preprocessing is sequentially TB-level CRC attachment, CB segmentation, CB-level CRC Attachment, channel coding, rate matching, CB Concatenation, scrambling, modulation, layer mapping, antenna port mapping, Mapping to Virtual Resource Blocks, Mapping from Virtual to Physical Resource Blocks, baseband signal generation, and modulation and Upconversion.

In one embodiment, the channel coding is polar-code-based.

In one embodiment, the channel coding is LDPC code-based.

Embodiment 1

Embodiment 1 illustrates a flowchart of transmissions of a first-type signaling, a second-type signaling and a first radio signal, as shown in FIG. 1. In FIG. 1, each box represents a step.

In Embodiment 1, a first node in the present disclosure first receives a first radio signal; then transmits a first-type signaling on a first radio resource, or, transmits a second-type signaling on a second radio resource; the first-type signaling is used for indicating that the first radio signal is correctly received; the second-type signaling is used for indicating that the first radio signal is not correctly received; time-domain resources occupied by the first radio resource and time-domain resources occupied by the second radio resource are orthogonal.

In one embodiment, when the first radio signal is correctly received by the first node, the first node transmits a first-type signaling on the first radio resource.

In one embodiment, when the first radio signal is not correctly received by the first node, the first node transmits the second-type signaling on the second radio resource.

In one embodiment, the first radio signal comprises the second-type signal in the present disclosure.

In one embodiment, the first radio signal comprises the third-type signal in the present disclosure.

In one embodiment, the first radio signal is transmitted on the second-type channel in the present disclosure.

In one embodiment, the first radio signal is transmitted on the third-type channel in the present disclosure.

In one embodiment, the first radio signal is Broadcast.

In one embodiment, the first radio signal is Groupcast.

In one embodiment, the first radio signal is Unicast.

In one embodiment, the first radio signal comprises all or part of a higher-layer signaling.

In one embodiment, the first radio signal comprises all or part of a Radio Resource Control (RRC) layer signaling.

In one embodiment, the first radio signal comprises one or more Fields in an RRC Information Element (IE).

In one embodiment, the first radio signal comprises all or part of a Multimedia Access Control (MAC) layer signaling.

In one embodiment, the first radio signal comprises one or more fields in a MAC Control Element (CE).

In one embodiment, the first radio signal comprises one or more fields in a PHY layer.

In one embodiment, the first radio signal comprises one or more fields in one piece of Uplink Control Information (UCI).

In one embodiment, the first radio signal comprises one or more fields in one piece of Sidelink Control Information (SCI).

In one embodiment, the specific meaning of SCI can be found in 3GPP TS36.212, section 5.4.3.

In one embodiment, the first radio signal comprises one or more Fields in a Master Information Block (MIB).

In one embodiment, the first radio signal comprises one or more fields in an MIB-SL.

In one embodiment, the first radio signal comprises one or more fields in an MIB-V2X-SL.

In one embodiment, the first radio signal comprises one or more Fields in a System Information Block (MIB).

In one embodiment, the first radio signal comprises one or more fields in one piece of Remaining Minimum System Information (RMSI).

In one embodiment, the first radio signal comprises one or more Fields in one piece of Other System Information (OSI).

In one embodiment, the first radio signal comprises one or more fields in an SCI format.

In one embodiment, the first radio signal comprises a first bit block, and the first bit block comprises a positive integer number of sequentially-arranged bits.

In one embodiment, the first bit block comprises one Code Block (CB).

In one embodiment, the first bit block comprises one CB Group (CBG).

In one embodiment, the first bit block comprises one Transport Block (TB).

In one embodiment, the first bit block is obtained by one TB subjected to a TB-level CRC Attachment.

In one embodiment, the first bit block is one of CB(s) obtained by one TB sequentially subjected to TB-level CRC attachment, CB Segmentation, and CB-level CRC attachment.

In one embodiment, the first radio signal is obtained by all or part of bits of the first bit block through the first preprocessing in the present disclosure.

In one embodiment, the first radio signal is obtained by all or part of bits of the first bit block through the second preprocessing in the present disclosure.

In one embodiment, the first radio signal is an output of all or part of bits of the first bit block through the first preprocessing in the present disclosure.

In one embodiment, the first radio signal is an output of all or part of bits of the first bit block through the second preprocessing in the present disclosure.

In one embodiment, only the first bit block is used to generate the first radio signal.

In one embodiment, there exists a CB other than the first bit block also being used for generating the first radio signal.

In one embodiment, the first radio signal does not comprise SCI.

In one embodiment, the first radio signal does not comprise UCI.

In one embodiment, the being correctly received means that the first radio signal determines that decoding is correct according to CRC bits after being received based on a blind detection.

In one embodiment, the being correctly received means that the first radio signal determines that decoding is correct according to CRC bits after being received and then performing decoding operation.

In one embodiment, the being correctly received means performing a coherent reception on a radio signal with an RS sequence corresponding to a DMRS of the first radio signal, and measuring energy of a signal obtained after the coherent reception, energy of the signal obtained after the coherent reception is greater than a first given threshold.

In one embodiment, the being correctly received means sensing energy of the first radio signal and averaging it on time to obtain received energy, and the received energy is greater than a second given threshold.

In one embodiment, the not being correctly received means that the first radio signal determines that decoding is not correct according to CRC bits after being received based on a blind detection.

In one embodiment, the not being correctly received means that the first radio signal determines that decoding is not correct according to CRC bits after being received and then performing decoding operation.

In one embodiment, the not being correctly received means performing a coherent reception on a radio signal with an RS sequence corresponding to a DMRS of the first radio signal, and measuring energy of a signal obtained after the coherent reception, energy of the signal obtained after the coherent reception is no greater than a first given threshold.

In one embodiment, the not being correctly received means sensing energy of the first radio signal and averaging it on time to obtain received energy, the received energy being no greater than a second given threshold.

In one embodiment, the first-type signaling is used for indicating that a transmitter of the first-type signaling correctly receives the first radio signal.

In one embodiment, the first-type signaling comprises Acknowledgment (ACK).

In one embodiment, the first-type signaling comprises Hybrid Automatic Repeat reQuest Acknowledgment (HARQ-ACK) that a transmitter of the first-type signaling corresponds to the first radio signal.

In one embodiment, the first-type signaling is transmitted on the third-type channel in the present disclosure.

In one embodiment, the first-type signaling is transmitted on the second-type channel in the present disclosure.

In one embodiment, the first-type signaling is transmitted on a PSCCH.

In one embodiment, the first-type signaling is transmitted on a PSSCH.

In one embodiment, the first-type signaling is transmitted on a PSDCH.

In one embodiment, the first-type signaling is Broadcast.

In one embodiment, the first-type signaling is Groupcast.

In one embodiment, the first-type signaling is Unicast.

In one embodiment, the first-type signaling comprises all or part of a higher-layer signaling.

In one embodiment, the first-type signaling comprises all or part of an RRC layer signaling.

In one embodiment, the first-type signaling comprises one or more fields of an RRC IE.

In one embodiment, the first-type signaling comprises all or part of a MAC layer signaling.

In one embodiment, the first-type signaling comprises one or more fields of a MAC CE.

In one embodiment, the first-type signaling comprises one or more fields of a PHY layer.

In one embodiment, the first-type signaling comprises one or more fields in one piece of UCI.

In one embodiment, the first-type signaling comprises one or more fields in one piece of SCI.

In one embodiment, the first-type signaling belongs to one piece of SCI.

In one embodiment, the second-type signaling is used for indicating that a transmitter of the second-type signaling not correctly receive the first radio signal.

In one embodiment, the second-type signaling is used for indicating that a transmitter of the second-type signaling request to retransmit the first radio signal.

In one embodiment, the second-type signaling comprises Negative Acknowledgment (NACK).

In one embodiment, the second-type signaling comprises Hybrid Automatic Repeat reQuest Negative Acknowledgment (HARQ-NACK) that a transmitter of the first-type signaling corresponds to the first radio signal.

In one embodiment, the second-type signaling is transmitted on the third-type channel in the present disclosure.

In one embodiment, the second-type signaling is transmitted on the second-type channel in the present disclosure.

In one embodiment, the second-type signaling is transmitted on a PSCCH.

In one embodiment, the second-type signaling is transmitted on a PSSCH.

In one embodiment, the second-type signaling is transmitted on a PSDCH.

In one embodiment, the second-type signaling is Broadcast.

In one embodiment, the second-type signaling is Groupcast.

In one embodiment, the second-type signaling is Unicast.

In one embodiment, the second-type signaling comprises all or part of a higher-layer signaling.

In one embodiment, the second-type signaling comprises all or part of an RRC-layer signaling.

In one embodiment, the second-type signaling comprises one or more fields of an RRC IE.

In one embodiment, the second-type signaling comprises all or part of a MAC layer signaling.

In one embodiment, the second-type signaling comprises one or more fields of a MAC CE.

In one embodiment, the second-type signaling comprises one or more fields of a PHY layer.

In one embodiment, the second-type signaling comprises one or more fields in one piece of UCI.

In one embodiment, the second-type signaling comprises one or more fields in one piece of SCI.

In one embodiment, the second-type signaling belongs to one piece of SCI.

In one embodiment, the first radio resource is one of Q1 first-type radio resource(s), the Q1 first-type radio resource(s) is(are) (a) candidate resource(s) for transmitting the first-type signaling, Q1 being a positive integer.

In one embodiment, the first node determines the first radio resource by itself.

In one embodiment, the first node selects the first radio resource out of Q1 first-type radio resource(s) by itself.

In one embodiment, the first node is configured to select the first radio resource out of the Q1 first-type radio resource(s).

In one embodiment, selecting the first radio resource out of the Q1 first-type radio resource(s) is related to the first radio signal.

In one embodiment, the first radio signal indicates the first radio resource.

In one embodiment, the first radio signal indicates an index of the first radio resource in the Q1 first-type radio resource(s).

In one embodiment, the first node selects the first radio resource out of the Q1 first-type radio resource(s) according to received quality of the first radio signal.

In one embodiment, the second radio resource is one of Q2 second-type radio resource(s), the Q2 second-type radio resource(s) is(are) (a) candidate resource(s) for transmitting the second-type signaling, Q1 being positive integer.

In one embodiment, the first node determines the second radio resource by itself.

In one embodiment, the first node selects the second radio resource out of Q2 second-type radio resource(s) by itself.

In one embodiment, the first node is configured to select the second radio resource out of the Q2 second-type radio resource(s).

In one embodiment, selecting the second radio resource out of the Q2 second-type radio resource(s) is related to the first radio signal.

In one embodiment, the first radio signal indicates the second radio resource.

In one embodiment, the first radio signal indicates an index of the second radio resource in the Q2 second-type radio resource(s).

In one embodiment, the first node selects the second radio resource out of the Q2 second-type radio resource(s) according to received quality of the first radio signal.

In one embodiment, the second radio resource is related to the first-type signaling detected on the first radio resource.

In one embodiment, the first-type signaling detected on the first radio resource indicates the Q2 second-type radio resource(s).

In one embodiment, the first radio resource and the second radio resource are non-overlapping in time domain.

In one embodiment, there does not exist one time belonging to the time-domain resources occupied by the first radio resource and the time-domain resources occupied by the second radio resource simultaneously.

In one embodiment, there does not exist one multicarrier symbol belonging to the time-domain resources occupied by the first radio resource and the time-domain resources occupied by the second radio resource simultaneously.

In one embodiment, the first radio resource and the second radio resource respectively comprise a first time-frequency resource and a second time-frequency resource in time-frequency domain.

In one embodiment, the first time-frequency resource and the second time-frequency resource respectively comprise multiple Resource Elements (REs).

In one embodiment, the first radio resource and the second radio resource respectively occupy C1 multi-access signature(s) and C2 multi-access signature(s), C1 and C2 respectively being positive integers.

In one embodiment, the first radio resource and the second radio resource respectively comprise M1 spatial parameter(s) and M2 spatial parameter(s) in space domain, M1 and M2 respectively being positive integers.

In one embodiment, the first radio resource and the second radio resource are respectively reserved for ACK and NACK associated with the first radio signal.

Embodiment 2

Figure 2:
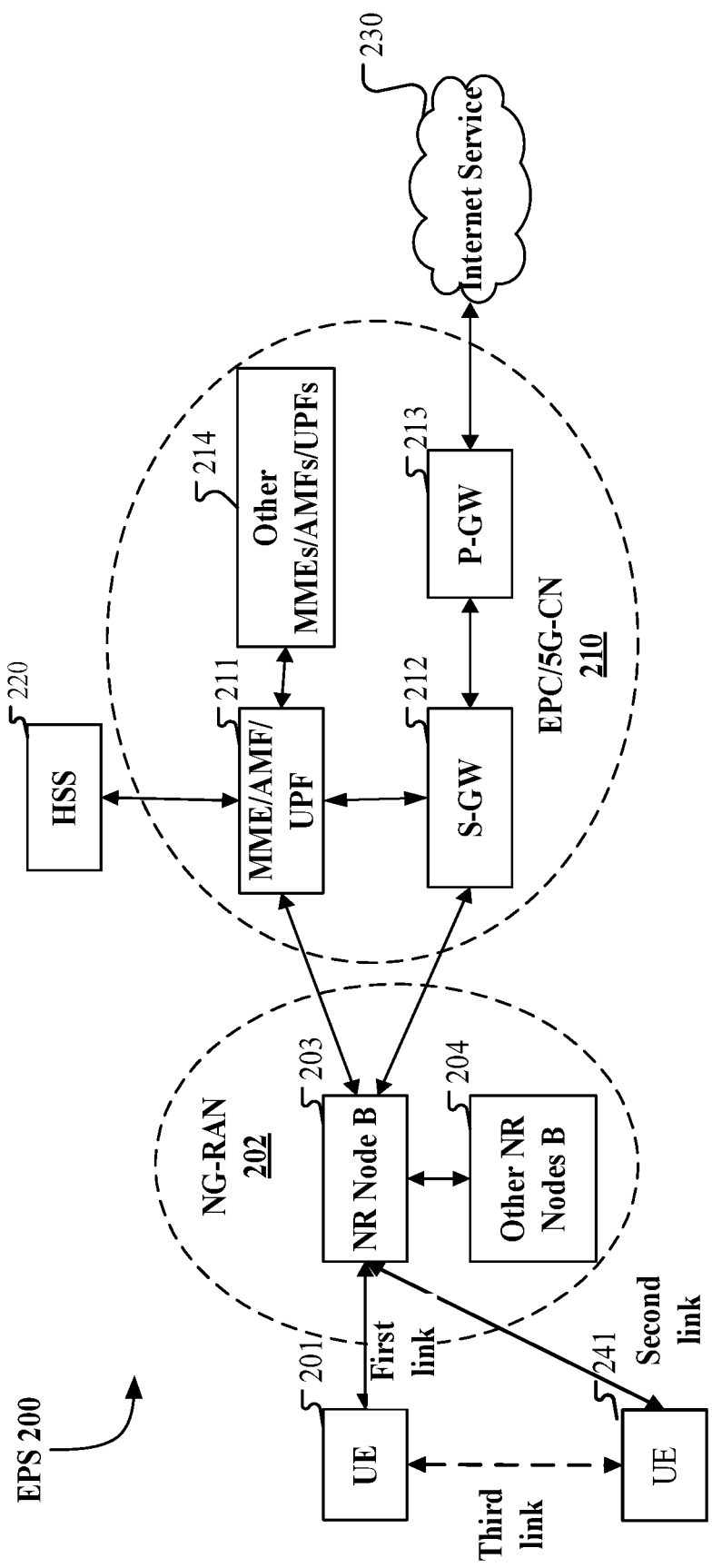
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things(IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the UE in the present disclosure comprises the UE 201.

In one embodiment, the second node in the present disclosure comprises the UE 241.

In one embodiment, the UE in the present disclosure comprises the UE 241.

In one embodiment, the UE 201 supports Sidelink communications.

In one embodiment, the UE 241 supports Sidelink communications.

In one embodiment, the UE 201 supports beamforming-based Sidelink communications.

In one embodiment, the UE 241 supports beamforming-based Sidelink communications.

In one embodiment, the UE 201 supports Massive MIMO-based Sidelink communications.

In one embodiment, the UE 241 supports Massive MIMO-based Sidelink communications.

In one embodiment, the UE 201 supports Carrier Aggregation (CA)-based Sidelink communications.

In one embodiment, the UE 241 supports Carrier Aggregation (CA)-based Sidelink communications.

In one embodiment, a transmitter of a first radio signal in the present disclosure comprises the UE 241.

In one embodiment, a receiver of a first radio signal in the present disclosure comprises the UE 201.

In one embodiment, a transmitter of a first-type signaling in the present disclosure comprises the UE 201.

In one embodiment, a receiver of a first-type signaling in the present disclosure comprises the UE 201.

In one embodiment, a receiver of a first-type signaling in the present disclosure comprises the UE 241.

In one embodiment, a transmitter of a second-type signaling in the present disclosure comprises the UE 201.

In one embodiment, a receiver of a second-type signaling in the present disclosure comprises the UE 201.

In one embodiment, a receiver of a second-type signaling in the present disclosure comprises the UE 241.

In one embodiment, a transmitter of a second radio signal in the present disclosure comprises the UE 201.

In one embodiment, a receiver of a second radio signal in the present disclosure comprises the UE 201.

In one embodiment, a receiver of a second radio signal in the present disclosure comprises the UE 241.

In one embodiment, a transmitter of a third radio signal in the present disclosure comprises the UE 201.

In one embodiment, a receiver of a third radio signal in the present disclosure comprises the UE 201.

In one embodiment, a receiver of a third radio signal in the present disclosure comprises the UE 241.

In one embodiment, a transmitter of a fourth radio signal in the present disclosure comprises the UE 241.

In one embodiment, a receiver of a fourth radio signal in the present disclosure comprises the UE 201.

Embodiment 3

Figure 3:
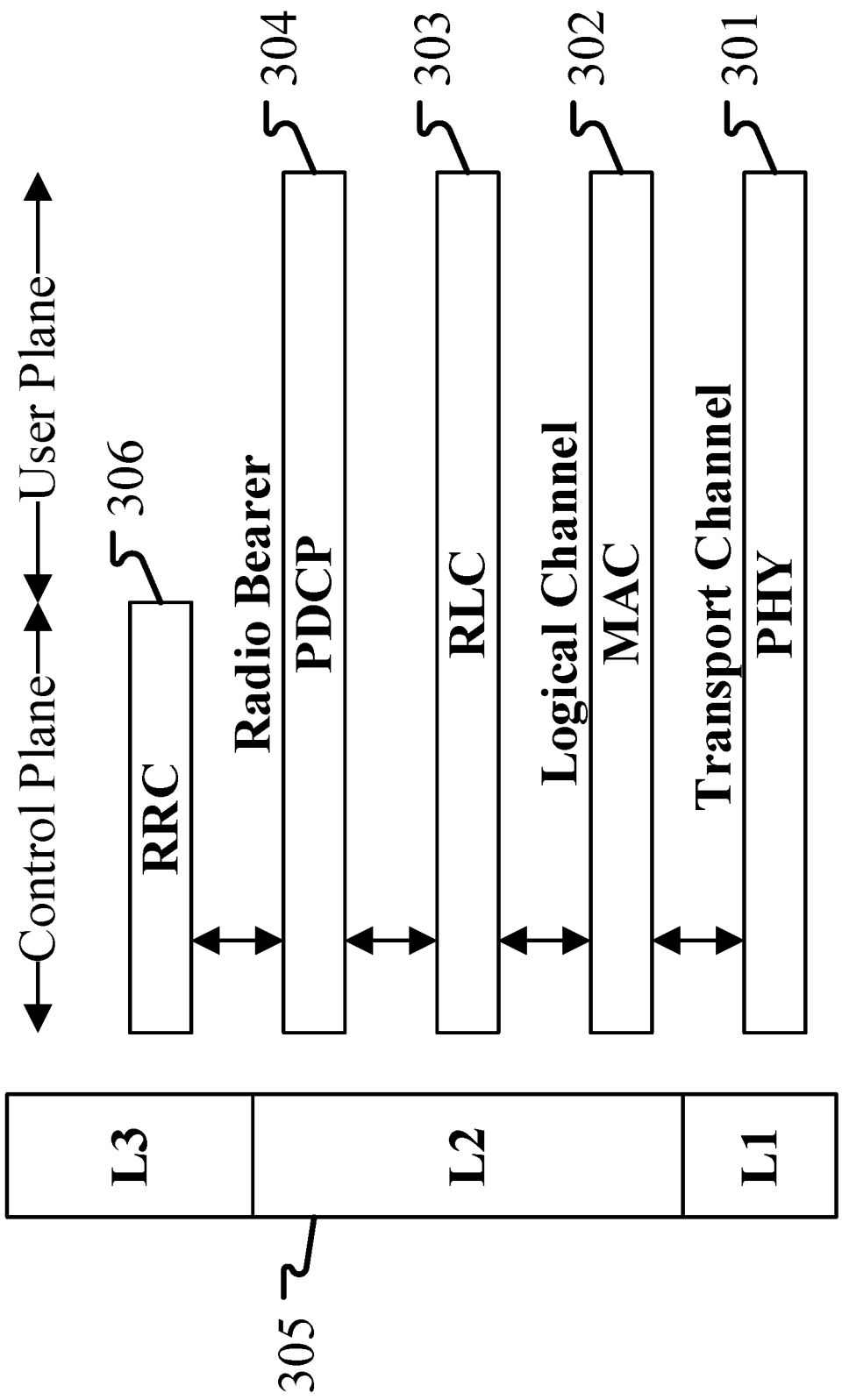
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. A layer above the layer 1 belongs to a higher layer. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for UE handover between base stations. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first radio signal in the present disclosure is generated by the RRC sublayer 306.

In one embodiment, at least one semi-persistent signaling comprised by the first radio signal in the present disclosure is generated by the RRC sublayer 306.

In one embodiment, the first radio signal in the present disclosure is generated by the MAC sublayer 302.

In one embodiment, the first radio signal in the present disclosure is generated by the PHY 301.

In one embodiment, the first radio signal in the present disclosure is transferred from the L2 layer to the PHY 301.

In one embodiment, the first radio signal in the present disclosure is transferred from the MAC sublayer 302 to the PHY 301.

In one embodiment, the second radio signal in the present disclosure is generated by the RRC sublayer 306.

In one embodiment, the second radio signal in the present disclosure is generated by the MAC sublayer 302.

In one embodiment, the second radio signal in the present disclosure is generated by the PHY 301.

In one embodiment, the second radio signal in the present disclosure is transferred from the L2 layer to the PHY 301.

In one embodiment, the second radio signal in the present disclosure is transferred from the MAC sublayer 302 to the PHY 301.

In one embodiment, the third radio signal in the present disclosure is generated by the RRC sublayer 306.

In one embodiment, the third radio signal in the present disclosure is generated by the MAC sublayer 302.

In one embodiment, the third radio signal in the present disclosure is generated by the PHY 301.

In one embodiment, the third radio signal in the present disclosure is transferred from the L2 layer to the PHY 301.

In one embodiment, the third radio signal in the present disclosure is transferred from the MAC sublayer 302 to the PHY 301.

In one embodiment, the fourth radio signal in the present disclosure is generated by the RRC sublayer 306.

In one embodiment, the fourth radio signal in the present disclosure is generated by the MAC sublayer 302.

In one embodiment, the fourth radio signal in the present disclosure is generated by the PHY 301.

In one embodiment, the fourth radio signal in the present disclosure is transferred from the L2 layer to the PHY 301.

In one embodiment, the fourth radio signal in the present disclosure is transferred from the MAC sublayer 302 to the PHY 301.

In one embodiment, the first-type signaling in the present disclosure is generated by the RRC sublayer 306.

In one embodiment, the first-type signaling in the present disclosure is generated by the MAC sublayer 302.

In one embodiment, the first-type signaling in the present disclosure is generated by the PHY 301.

In one embodiment, the first-type signaling in the present disclosure is transferred from the L2 layer to the PHY 301.

In one embodiment, the first-type signaling in the present disclosure is transferred from the MAC sublayer 302 to the PHY 301.

In one embodiment, the second-type signaling in the present disclosure is generated by the RRC sublayer 306.

In one embodiment, the second-type signaling in the present disclosure is generated by the MAC sublayer 302.

In one embodiment, the second-type signaling in the present disclosure is generated by the PHY 301.

In one embodiment, the second-type signaling in the present disclosure is transferred from the L2 layer to the PHY 301.

In one embodiment, the second-type signaling in the present disclosure is transferred from the MAC sublayer 302 to the PHY 301.

Embodiment 4

Figure 4:
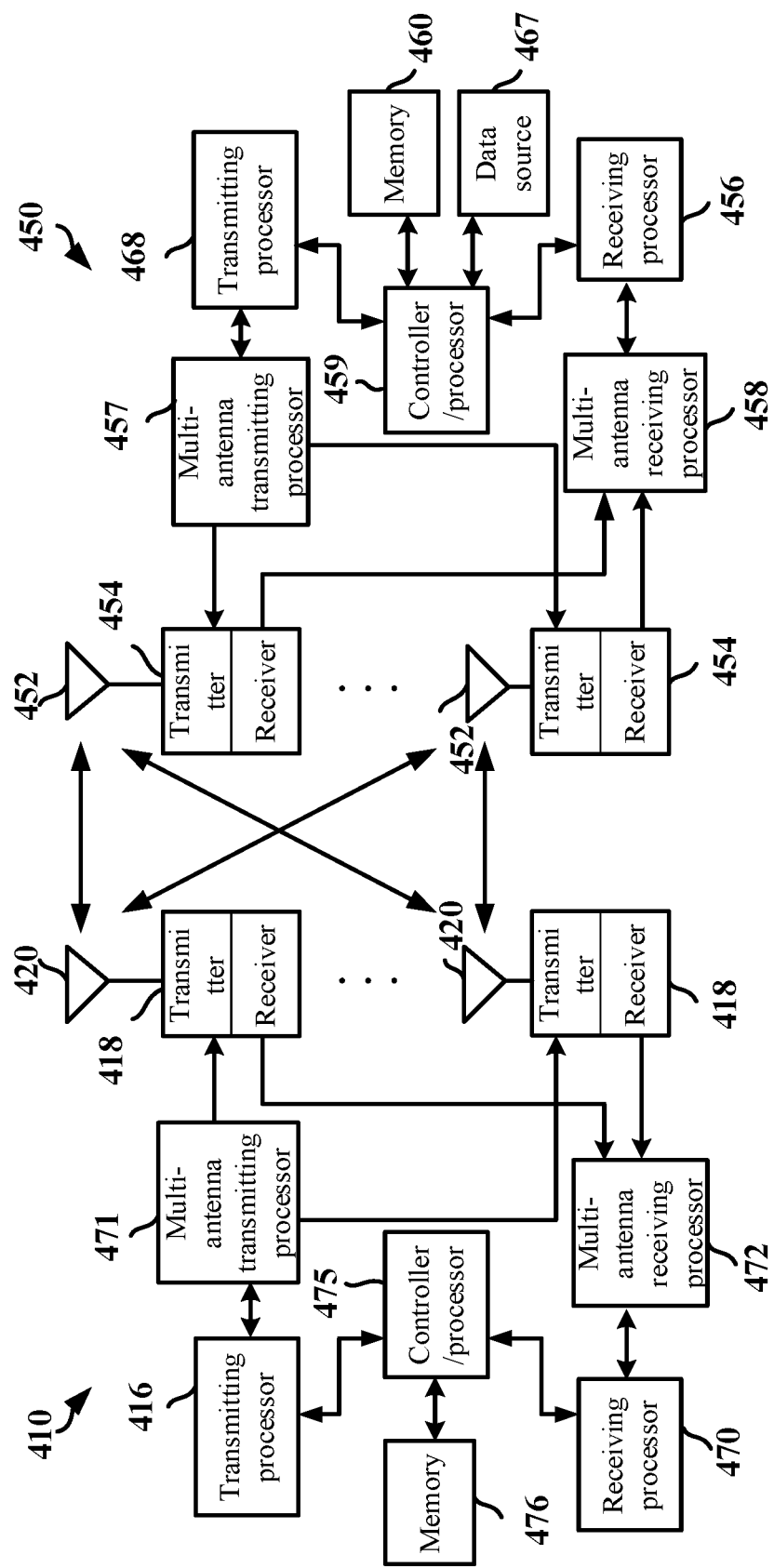
FIG. 4 illustrates a schematic diagram of a first node and a second node according to one embodiment of the present disclosure.

Embodiment 4 illustrates a schematic diagram of a first communication device and a second communication device in the present disclosure, as shown in FIG. 4. FIG. 4 is a block diagram of a first communication device 410 and a second communication device 450 that are in communication with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device to the first communication device, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the present disclosure, the first node and the second node are UEs.

In one subembodiment of the above embodiment, the first node and the second node are relay nodes.

In one subembodiment of the above embodiment, the first node is a relay node, and the second node is a UE.

In one subembodiment of the above embodiment, the first communication device 410 comprises at least one controller/processor; the at least one controller/processor is responsible for HARQ operation.

In one subembodiment of the above embodiment, the second communication device 450 comprises at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first radio signal; and transmits a first-type signaling on a first radio resource, the first-type signaling being used for indicating that the first radio signal is correctly received; or, transmits a second-type signaling on a second radio resource, the second-type signaling being used for indicating that the first radio signal is not correctly received; and time-domain resources occupied by the first radio resource and time-domain resources occupied by the second radio resource are orthogonal.

In one embodiment, the second communication device 450 comprises a memory that stores a computer readable instruction program. The computer readable instruction program generates an action when executed by at least one processor. The action includes receiving a first radio signal; and transmitting a first-type signaling on a first radio resource, the first-type signaling being used for indicating that the first radio signal is correctly received; or, transmitting a second-type signaling on a second radio resource, the second-type signaling being used for indicating that the first radio signal is not correctly received; and time-domain resources occupied by the first radio resource and time-domain resources occupied by the second radio resource are orthogonal.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first radio signal; and monitors a first-type signaling on a first radio resource, or, transmits a second-type signaling on a second radio resource; herein, the first-type signaling is used for indicating that the first radio signal is correctly received, and the second-type signaling is used for indicating that the first radio signal is not correctly received; and time-domain resources occupied by the first radio resource and time-domain resources occupied by the second radio resource are orthogonal.

In one embodiment, the first communication device 410 comprises a memory that stores a computer readable instruction program. The computer readable instruction program generates an action when executed by at least one processor. The action includes transmitting a first radio signal; and monitoring a first-type signaling on a first radio resource, or, transmitting a second-type signaling on a second radio resource; herein, the first-type signaling is used for indicating that the first radio signal is correctly received, and the second-type signaling is used for indicating that the first radio signal is not correctly received; and time-domain resources occupied by the first radio resource and time-domain resources occupied by the second radio resource are orthogonal.

In one embodiment, at least one of the antenna 452, the receiver 454, the multi-antenna receiving processor 458, the receiving processor 456, the controller/processor 459, the memory 460, or the data source 467 is used to receive the first radio signal in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first-type signaling in the present disclosure on the first radio resource in the present disclosure.

In one embodiment, at least one of the antenna 452, the receiver 454, the multi-antenna receiving processor 458, the receiving processor 456, the controller/processor 459, the memory 460, or the data source 467 is used to monitor the second-type signaling in the present disclosure on the second radio resource in the present disclosure.

In one embodiment, at least one of the antenna 452, the transmitter 454, the multi-antenna transmission processor 458, the transmitting processor 468, the controller/processor 459, the memory 460, or the data source 467 is used to transmit a second radio signal in the present disclosure on a third radio resource in the present disclosure.

In one embodiment, at least one of the antenna 452, the transmitter 454, the multi-antenna transmission processor 458, the transmitting processor 468, the controller/processor 459, the memory 460, or the data source 467 is used to transmit the second-type signaling in the present disclosure on the second radio resource in the present disclosure.

In one embodiment, at least one of the antenna 452, the receiver 454, the multi-antenna receiving processor 458, the receiving processor 456, the controller/processor 459, the memory 460, or the data source 467 is used to monitor the first-type signaling in the present disclosure on the first radio resource in the present disclosure.

In one embodiment, at least one of the antenna 452, the receiver 454, the multi-antenna receiving processor 458, the receiving processor 456, the controller/processor 459, the memory 460, or the data source 467 is used to monitor a third radio signal in the present disclosure on a fourth radio resource in the present disclosure.

In one embodiment, at least one of the antenna 452, the receiver 454, the multi-antenna receiving processor 458, the receiving processor 456, the controller/processor 459, the memory 460, or the data source 467 is used to detect P candidate signalings in the present disclosure on the first radio resource in the present disclosure.

In one embodiment, at least one of the antenna 452, the receiver 454, the multi-antenna receiving processor 458, the receiving processor 456, the controller/processor 459, the memory 460, or the data source 467 is used to select the first-type signaling in the present disclosure out of the P candidate signalings in the present disclosure.

In one embodiment, at least one of the antenna 420, the transmitter 418, the multi-antenna transmitting processor 471, the transmitting processor 416, the controller/processor 475, or the memory 476 is used to transmit the first radio signal in the present disclosure.

In one embodiment, at least one of the antenna 420, the receiver 418, the multi-antenna receiving processor 472, the receiving processor 470, the controller/processor 475, or the memory 476 is used to monitor the first-type signaling on the first radio resource in the present disclosure.

In one embodiment, at least one of the antenna 420, the receiver 418, the multi-antenna receiving processor 472, the receiving processor 470, the controller/processor 475, or the memory 476 is used to monitor the second-type signaling on the second radio resource in the present disclosure.

In one embodiment, at least one of the antenna 420, the transmitter 418, the multi-antenna transmitting processor 471, the transmitting processor 416, the controller/processor 475, or the memory 476 is used to transmit a fourth radio signal in the present disclosure on a fifth radio resource in the present disclosure.

In one embodiment, at least one of the antenna 420, the receiver 418, the multi-antenna receiving processor 472, the receiving processor 470, the controller/processor 475, or the memory 476 is used to detect P candidate signalings in the present disclosure on the first radio resource in the present disclosure.

In one embodiment, at least one of the antenna 420, the receiver 418, the multi-antenna receiving processor 472, the receiving processor 470, the controller/processor 475, or the memory 476 is used to select the first-type signaling in the present disclosure out of the P candidate signalings in the present disclosure.

Embodiment 5

Figure 5:
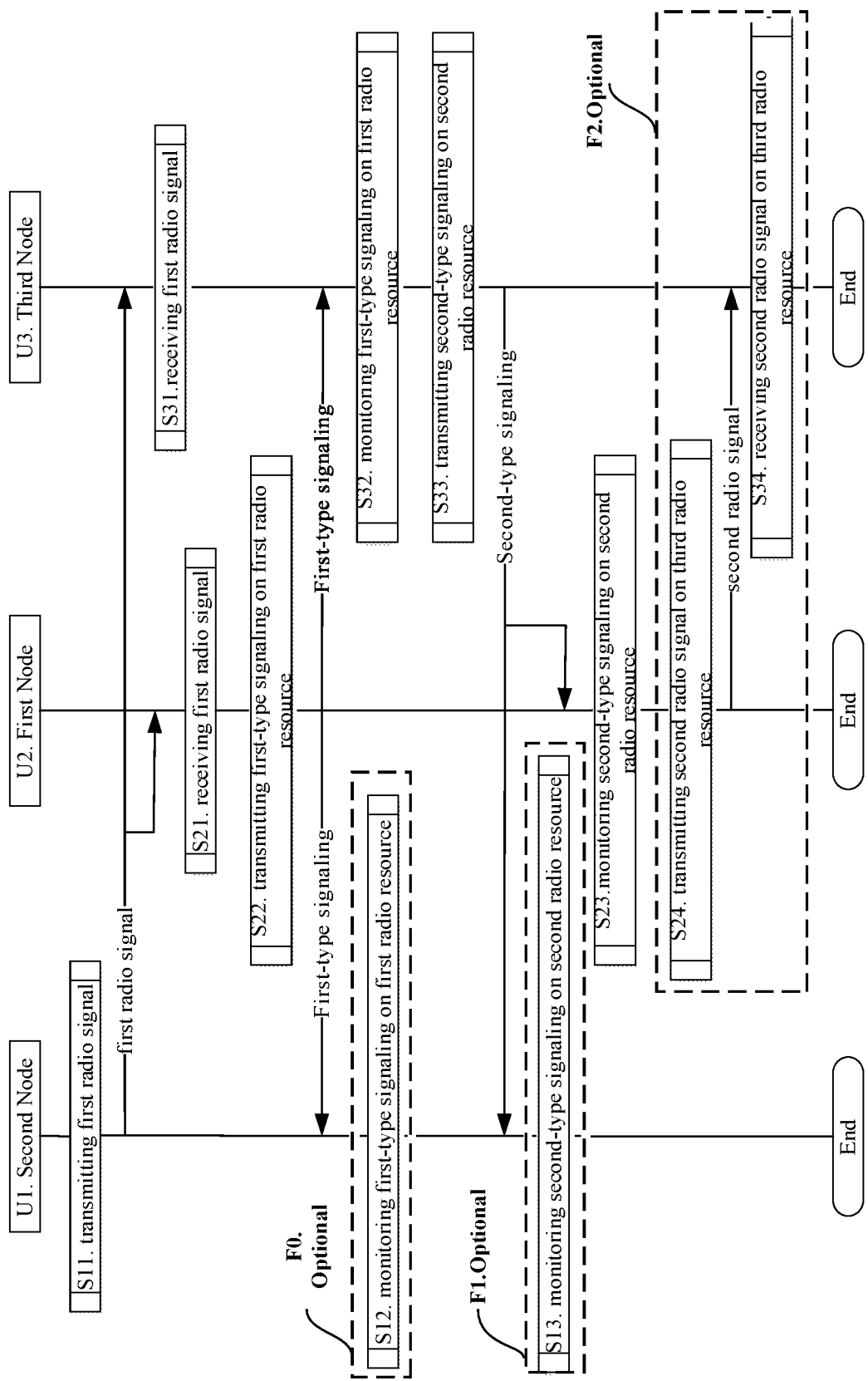
FIG. 5 illustrates a flowchart of a radio signal transmission according to one embodiment of the present disclosure.

Embodiment 5 illustrates a flowchart of a radio signal transmission according to one embodiment in the present disclosure, as shown in FIG. 5. In FIG. 5, a second node U1, a first node U2, and a third node U3 are communication nodes transmitted through Sidelink. In FIG. 5, steps in dot-framed boxes F0, F1 and F2 are respectively optional.

The second node U1 transmits a first radio signal in step S11; monitors a first-type signaling on a first radio resource in step S12; and monitors a second-type signaling on a second radio resource in step S13.

The first node U2 receives a first radio signal in step S21; transmits a first-type signaling on a first radio resource in step S22; monitors a second-type signaling on a second radio resource in step S23; and transmits a second radio signal on a third radio resource in step S24.

The third node U3 receives a first radio signal in step S31; monitors a first-type signaling on a first radio resource in step S32; transmits a second-type signaling on a second radio resource in step S33; and receives a second radio signal on a third radio resource in step S34.

In Embodiment 5, the first-type signaling is used for indicating that the first radio signal is correctly received by a receiver of the first radio signal; the second-type signaling is used for indicating that the first radio signal is not correctly received by a receiver of the first radio signal; time-domain resources occupied by the first radio resource and time-domain resources occupied by the second radio resource are orthogonal; a first bit block is used for generating the first radio signal, and the first bit block is used for generating the second radio signal; and the first-type signaling transmitted by the first node is used for indicating the third radio resource.

In one embodiment, when the first node detects the second-type signaling on the second radio resource, the box F2 in FIG. 5 exists.

In one embodiment, when the first node does not detect the second-type signaling on the second radio resource, the box F2 in FIG. 5 does not exist.

In one embodiment, each of steps in box F0 and box F1 in FIG. 5 exists.

In one embodiment, steps in box F0 and box F1 in FIG. 5 do not exist.

In one embodiment, each of steps in box F1 and box F2 in FIG. 5 exists.

In one embodiment, when the second-type signaling is detected by the first node, the first node transmits the second radio signal on the third radio resource.

In one embodiment, when the second-type signaling is not detected by the first node, the first node drops transmission of the second radio signal on the third radio resource.

In one embodiment, the second-type signaling monitored by the first node is used for indicating that the first radio signal is not correctly received by the transmitter of the second-type signaling monitored by the first node.

In one embodiment, the not being correctly received means that the transmitter of the second-type signaling monitored by the first node receives the first radio signal and performs decoding operation, and determines that the decoding is not correct according to CRC bits.

In one embodiment, the second radio signal comprises the second-type signal in the present disclosure.

In one embodiment, the second radio signal comprises the third-type signal in the present disclosure.

In one embodiment, the second radio signal is transmitted on the second-type channel in the present disclosure.

In one embodiment, the second radio signal is transmitted on the third-type channel in the present disclosure.

In one embodiment, the second radio signal comprises all or part of bits in the first bit block.

In one embodiment, the second radio signal is obtained by all or part of bits of the first bit block through the first preprocessing in the present disclosure.

In one embodiment, the second radio signal is obtained by all or part of bits of the first bit block through the second preprocessing in the present disclosure.

In one embodiment, the second radio signal is an output of all or part of bits of the first bit block through the first preprocessing in the present disclosure.

In one embodiment, the second radio signal is an output of all or part of bits of the first bit block through the second preprocessing in the present disclosure.

In one embodiment, only the first bit block is used to generate the second radio signal.

In one embodiment, there exists a CB other than the first bit block also being used for generating the second radio signal.

In one embodiment, the action of dropping transmission of a second radio signal on the third radio resource includes maintaining zero transmission power on the third radio resource.

In one embodiment, the action of dropping transmission of a second radio signal on the third radio resource includes transmitting a radio signal unrelated to the first bit block on the third radio resource.

In one embodiment, the action of dropping transmission of a second radio signal on the third radio resource includes releasing buffer corresponding to the second radio signal.

In one embodiment, the second-type signaling comprises a first signature sequence.

In one embodiment, the first signature sequence is a pseudo-random sequence.

In one embodiment, the first signature sequence is a Gold sequence.

In one embodiment, the first signature sequence is an M sequence.

In one embodiment, the first signature sequence is a Zadeoff-Chu sequence.

In one embodiment, the second-type signaling is an output after the first signature sequence sequentially through Sequence Generation, Modulation, Resource Element Mapping, and bandwidth symbol generation.

In one embodiment, the second-type signaling is an output after the first signature sequence through at least one of Sequence Generation, Modulation, Resource Element Mapping, and bandwidth symbol generation.

In one embodiment, the second-type signaling is a combination of radio signals transmitted by multiple UEs, and each of the multiple UEs transmits one the first signature sequence.

In one embodiment, the second-type signaling comprises a positive integer number of candidate signature sequence(s), and the first signature sequence is one of the positive integer number of candidate signature sequence(s).

In one embodiment, the second-type signaling is a set of the positive integer number of candidate signature sequence(s).

In one embodiment, the second-type signaling comprises a positive integer number of signature bit(s), each of the positive integer number of signature bit(s) respectively corresponds to a positive integer number of UE(s), and each of the positive integer number of UE(s) transmits at least one of the positive integer number of signature bit(s).

In one embodiment, the second-type signaling is a set of the positive integer number of signature bit(s).

In one embodiment, the first-type signaling comprises a first target sequence.

In one embodiment, the first target sequence is a pseudo-random sequence.

In one embodiment, the first target sequence is a Gold sequence.

In one embodiment, the first target sequence is an M sequence.

In one embodiment, the first target sequence is a Zadeoff-Chu sequence.

In one embodiment, the first-type signaling is an output after the first target sequence sequentially through Sequence Generation, Modulation, Resource Element Mapping, and bandwidth symbol generation.

In one embodiment, the first-type signaling is an output after the first target sequence through at least one of Sequence Generation, Modulation, Resource Element Mapping, and bandwidth symbol generation.

In one embodiment, a first identity is used for identifying the first node.

In one embodiment, the first identity is used for identifying a transmitter of the second radio signal.

In one embodiment, the first identity is used for identifying a sequence of a radio signal.

In one embodiment, the first identity is used for generating a scrambling sequence for scrambling a radio signal.

In one embodiment, the first identity is configured by a higher-layer signaling.

In one embodiment, the first identity is semi-statically configured.

In one embodiment, the first identity is configured by a physical-layer signaling.

In one embodiment, the first identity is dynamically-configured.

In one embodiment, the first identity is a Radio Network Temporary Identity (RNTI).

In one embodiment, the first identity is a Cell RNTI (C-RNTI).

In one embodiment, the first identity is a Temporal C-RNTI (TC-RNTI).

In one embodiment, the first identity is a Radio Access RNTI (RA-RNTI).

In one embodiment, the first identity is a System Information RNTI (SI-RNTI).

In one embodiment, the first identity is a Paging RNTI (P-RNTI).

In one embodiment, the first identity is an integer no less than 0 and no greater than $2^{30}$.

In one embodiment, the first identity is a 16-bit binary non-negative integer.

In one embodiment, a number of bits occupied by the first identity is less than 9.

In one embodiment, a number of bits occupied by the first identity is less than 16.

In one embodiment, a number of bits occupied by the first identity is configurable.

In one embodiment, a number of bits occupied by the first identity is fixed.

In one embodiment, the first-type signaling transmitted by the first node indicates a first identity, and the second-type signaling monitored by the first node indicates the first identity.

In one embodiment, the first-type signaling transmitted by the first node indicates an identity of the first node, and the second-type signaling monitored by the first node indicates an identity of the first node.

In one embodiment, the first-type signaling transmitted by the first node comprises the first identity.

In one embodiment, the first identity is used for generating the first target sequence.

In one embodiment, the first identity is used for calculating a root sequence index of the first target sequence.

In one embodiment, the first identity is used for calculating a cyclic shift value of the first target sequence.

In one embodiment, the first identity is used for selecting the first target sequence out of a positive integer number of candidate target sequence(s), and the first target sequence is one of the positive integer number of candidate target sequence(s).

In one embodiment, the first identity is used for indicating an index of the first target sequence in the positive integer number of candidate target sequence(s).

In one embodiment, the first identity is used for determining a time-frequency position of the first-type signaling on the first radio resource.

In one embodiment, the first identity is used for determining a time-domain position of the first-type signaling on the first radio resource.

In one embodiment, the first identity is used for determining a frequency domain position of the first-type signaling on the first radio resource.

In one embodiment, the first identity is used for determining spatial parameters of the first-type signaling on the first radio resource.

In one embodiment, the first identity is used for generating a scrambling sequence of the first-type signaling.

In one embodiment, the first-type signaling transmitted by the first node comprises an identity of a transmitter of the second radio signal.

In one embodiment, the identity of a transmitter of the second radio signal is used for generating the first target sequence.

In one embodiment, the identity of a transmitter of the second radio signal is used for calculating a root sequence index of the first target sequence.

In one embodiment, the identity of a transmitter of the second radio signal is used for calculating a cyclic shift value of the first target sequence.

In one embodiment, the identity of a transmitter of the second radio signal is used for selecting the first target sequence out of a positive integer number of candidate target sequence(s), and the first target sequence is one of the positive integer number of candidate target sequence(s).

In one embodiment, the identity of a transmitter of the second radio signal is used for indicating an index of the first target sequence in the positive integer number of candidate signature sequence(s).

In one embodiment, the identity of a transmitter of the second radio signal is used for determining a time-frequency position of the first-type signaling on the first radio resource.

In one embodiment, the identity of a transmitter of the second radio signal is used for determining a time-domain position of the first-type signaling on the first radio resource.

In one embodiment, the identity of a transmitter of the second radio signal is used for determining a frequency-domain position of the first-type signaling on the first radio resource.

In one embodiment, the identity of a transmitter of the second radio signal is used for determining spatial parameters of the first-type signaling on the first radio resource.

In one embodiment, the identity of a transmitter of the second radio signal is used for generating a scrambling sequence of the first-type signaling.

In one embodiment, the second-type signaling monitored by the first node comprises the first identity.

In one embodiment, the first identity is used for generating the first signature sequence.

In one embodiment, the first identity is used for calculating a root sequence index of the first signature sequence.

In one embodiment, the first identity is used for calculating a cyclic shift value of the first signature sequence.

In one embodiment, the first identity is used for selecting the first signature sequence out of a positive integer number of candidate signature sequence(s), and the first signature sequence is one of the positive integer number of candidate signature sequence(s).

In one embodiment, the first identity is used for indicating an index of the first signature sequence in the positive integer number of candidate signature sequence(s).

In one embodiment, the first identity is used for determining a time-frequency position of the second-type signaling on the second radio resource.

In one embodiment, the first identity is used for determining a time-domain position of the second-type signaling on the second radio resource.

In one embodiment, the first identity is used for determining a frequency-domain position of the second-type signaling on the second radio resource.

In one embodiment, the first identity is used for determining spatial parameters of the second-type signaling on the second radio resource.

In one embodiment, the first identity is used for generating a scrambling sequence of the second-type signaling.

In one embodiment, the second-type signaling monitored by the first node comprises an identity of a transmitter of the second radio signal.

In one embodiment, the identity of a transmitter of the second radio signal is used for generating the first signature sequence.

In one embodiment, the identity of a transmitter of the second radio signal is used for calculating a root sequence index of the first signature sequence.

In one embodiment, the identity of a transmitter of the second radio signal is used for calculating a cyclic shift value of the first signature sequence.

In one embodiment, the identity of a transmitter of the second radio signal is used for selecting the first signature sequence out of a positive integer number of candidate signature sequence(s), the first signature sequence being one of the positive integer number of candidate signature sequence(s).

In one embodiment, the identity of a transmitter of the second radio signal is used for indicating an index of the first signature sequence in the positive integer number of candidate signature sequence(s).

In one embodiment, the identity of a transmitter of the second radio signal is used for determining a time-frequency position of the second-type signaling on the second radio resource.

In one embodiment, the identity of a transmitter of the second radio signal is used for determining a time-domain position of the second-type signaling on the second radio resource.

In one embodiment, the identity of a transmitter of the second radio signal is used for determining a frequency-domain position of the second-type signaling on the second radio resource.

In one embodiment, the identity of a transmitter of the second radio signal is used for determining spatial parameters of the second-type signaling on the second radio resource.

In one embodiment, the identity of a transmitter of the second radio signal is used for generating a scrambling sequence of the second-type signaling.

In one embodiment, the first-type signaling transmitted by the first node explicitly indicates the third radio resource.

In one embodiment, an RE set occupied by the first-type signaling transmitted by the first node implicitly indicates the third radio resource.

In one embodiment, the third radio-resource-pool comprises Q3 third-type radio resource(s), the third radio resource is one of the Q3 third-type radio resource(s), Q3 being a positive integer.

In one embodiment, the first-type signaling comprises a first bitmap, the first bitmap comprising Q3 bit(s), and each of the Q3 bit(s) respectively corresponds to the Q3 third-type radio resource(s).

In one embodiment, the first-type signaling comprises a first bitmap, the first bitmap comprising Q3 bit(s), and one bit in the first bitmap corresponds to one of the Q3 third-type radio resource(s).

In one embodiment, the first-type signaling comprises a first bitmap, the first bitmap comprising Q3 bit(s); a given first bit is any of the Q3 bit(s) in the first bitmap, and the given first bit is used for corresponding to a given third-type radio resource in the Q3 third-type radio resource(s); when the given first bit is equal to 1, the given third-type radio resource comprises the third radio resource.

In one embodiment, the first-type signaling comprises a first bitmap, the first bitmap comprising Q3 bit(s); a given first bit is any of the Q3 bit(s) in the first bitmap, and the given first bit is used for corresponding to a given third-type radio resource in the Q3 third-type radio resource(s); when the given first bit is equal to 1, the given third-type radio resource is the third radio resource.

In one embodiment, the first-type signaling comprises an index of the third radio resource in the Q3 third-type radio resource(s).

In one embodiment, the first-type signaling indicates an index of the third radio resource in the Q3 third-type radio resource(s).

In one embodiment, the first-type signaling indicates time-frequency resources of the third radio resource.

In one embodiment, the first-type signaling indicates time-domain resources of the third radio resource.

In one embodiment, the first-type signaling indicates frequency-domain resources of the third radio resource.

In one embodiment, the first-type signaling indicates spatial resources of the third radio resource.

In one embodiment, the first-type signaling indicates code-domain resources of the third radio resource.

In one embodiment, the first-type signaling comprises Sidelink periodicity.

In one embodiment, the first-type signaling comprises UL/DL subframe configurations.

In one embodiment, the specific definition of UL/DL subframe configurations can be found in 3GPP TS36.211, section 4.2, table 4.2-2.

In one embodiment, the first-type signaling comprises UL/DL slot configurations.

In one embodiment, the first-type signaling comprises UL/DL symbol configurations.

In one embodiment, the first-type signaling indicates Slot formats.

In one embodiment, the specific definition of the Slot formats can be found in 3GPP TS38.213, section 11.1.1, table 11.1.1-1.

In one embodiment, the first-type signaling comprises a Radio Frame Number.

In one embodiment, the first-type signaling comprises a Subframe Number.

In one embodiment, the first-type signaling comprises Sidelink bandwidth.

In one embodiment, the first-type signaling comprises a Carrier Number.

In one embodiment, the first-type signaling indicates a carrier corresponding to the third radio resource.

In one embodiment, the first-type signaling comprises time-frequency resources of a Bandwidth Part.

In one embodiment, the first-type signaling comprises an index of a BWP in carrier.

In one embodiment, the first-type signaling comprises a minimum Physical Resource Block index of the third radio resource.

In one embodiment, the first-type signaling indicates a number of PRBs comprised in the third radio resource.

In one embodiment, the first-type signaling indicates a maximum number of PRBs for transmitting radio signals on the third radio resource.

In one embodiment, the first-type signaling indicates a Subcarrier Spacing (SCS) of a radio signal transmitted on the third radio resource.

In one embodiment, the first-type signaling indicates a center frequency and bandwidth of the third radio resource.

In one embodiment, the center frequency is an Absolute Radio Frequency Channel Number (AFCN).

In one embodiment, the center frequency is a positive integral multiple of 100 kHz.

In one embodiment, the first-type signaling indicates a lowest frequency point and a highest frequency point of the third radio resource.

In one embodiment, the first-type signaling indicates a lowest frequency point and a bandwidth of frequency-domain resources occupied by the third radio resource.

In one embodiment, the first-type signaling indicates a slot on the third radio resource used for transmitting a radio signal.

In one embodiment, the first-type signaling indicates an earliest time of time-domain resources occupied by a third radio resource.

In one embodiment, the first-type signaling indicates a latest time of time-domain resources occupied by a third radio resource.

In one embodiment, the first-type signaling indicates an earliest time and a duration of time-domain resources occupied by a third radio resource.

In one embodiment, the first-type signaling comprises one antenna port group.

In one embodiment, the first-type signaling comprises an antenna port index.

In one embodiment, the first-type signaling indicates spatial parameters on the third radio resource used for transmitting a radio signal.

Embodiment 6

Figure 6:
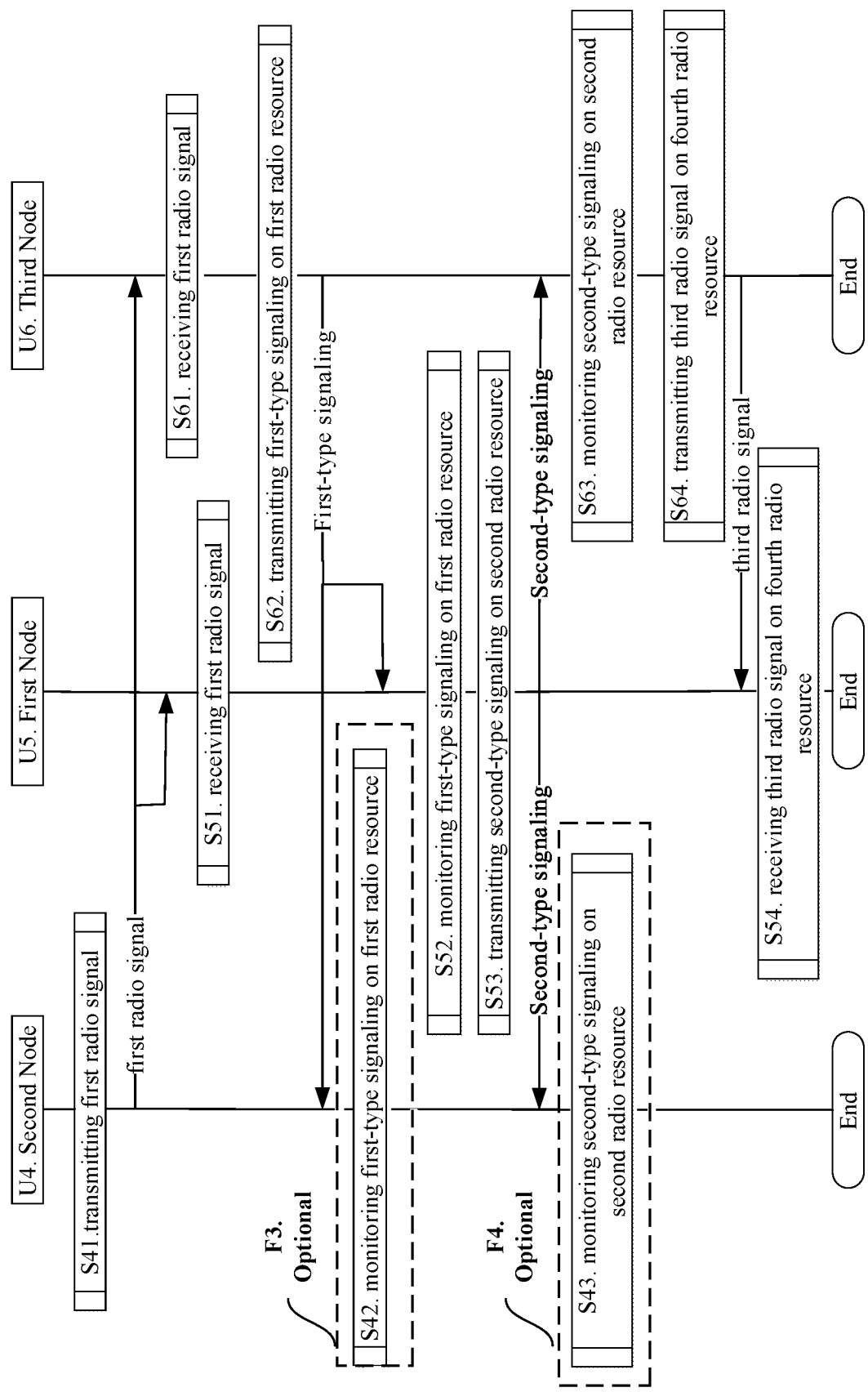
FIG. 6 illustrates a flowchart of a radio signal transmission according to one embodiment of the present disclosure.

Embodiment 6 illustrates a flowchart of radio signal transmission according to one embodiment of the present disclosure, as shown in FIG. 6. In FIG. 6, a second node U4, a first node U5, and a third node U6 are communication nodes transmitted through Sidelink. In FIG. 6, steps in dot-framed boxes F3 and F4 are respectively optional.

The second node U4 transmits a first radio signal in step S41; monitors a first-type signaling on a first radio resource in step S42; and monitors a second-type signaling on a second radio resource in step S43.

The first node U5 receives a first radio signal in step S51; monitors a first-type signaling on a first radio resource in step S52; transmits a second-type signaling on a second radio resource in step S53; and receives a third radio signal on a fourth radio resource in step S54.

The third node U6 receives a first radio signal in step S61; transmits a first-type signaling on a first radio resource in step S62; monitors a second-type signaling on a second radio resource in step S63; and transmits a third radio signal on a fourth radio resource in step S64.

In Embodiment 6, the first-type signaling is used for indicating that the first radio signal is correctly received by a receiver of the first radio signal; the second-type signaling is used for indicating that the first radio signal is not correctly received by a receiver of the first radio signal; time-domain resources occupied by the first radio resource and time-domain resources occupied by the second radio resource are orthogonal; a first bit block is used for generating the first radio signal, and the first bit block is used for generating the third radio signal; the second-type signaling transmitted by the first node is used for indicating the fourth radio resource.

In one embodiment, steps in boxes F3 and F4 in FIG. 6 exist.

In one embodiment, steps in boxes F3 and F4 in FIG. 6 do not exist.

In one embodiment, when the first-type signaling is detected by the first node on the first radio resource, the second-type signaling transmitted by the first node comprises an identity of a transmitter of the first-type signaling.

In one embodiment, when the first-type signaling is not detected by the first node on the first radio resource, the second-type signaling transmitted by the first node comprises an identity of a transmitter of the first radio signal.

In one embodiment, the first-type signaling monitored by the first node is used for indicating that the first radio signal is correctly received by a transmitter of the first-type signaling monitored by the first node.

In one embodiment, the third radio signal comprises the second-type signal in the present disclosure.

In one embodiment, the third radio signal comprises the third-type signal in the present disclosure.

In one embodiment, the third radio signal is transmitted on the second-type channel in the present disclosure.

In one embodiment, the third radio signal is transmitted on the third-type channel in the present disclosure.

In one embodiment, the third radio signal comprises all or part of bits in the first bit block.

In one embodiment, the third radio signal is obtained by all or part of bits of the first bit block through the first preprocessing in the present disclosure.

In one embodiment, the third radio signal is obtained by all or part of bits of the first bit block through the second preprocessing in the present disclosure.

In one embodiment, the third radio signal is an output of all or part of bits of the first bit block through the first preprocessing in the present disclosure.

In one embodiment, the third radio signal is an output of all or part of bits of the first bit block through the second preprocessing in the present disclosure.

In one embodiment, only the first bit block is used to generate the third radio signal.

In one embodiment, there exists a CB other than the first bit block also being used for generating the third radio signal.

In one embodiment, a second identity is used for identifying a transmitter of the third radio signal.

In one embodiment, a second identity is used for identifying the third node.

In one embodiment, the second identity is used for identifying a sequence of a radio signal.

In one embodiment, the second identity is used for generating a scrambling sequence for scrambling a radio signal.

In one embodiment, the second identity is configured by a higher-layer signaling.

In one embodiment, the second identity is semi-statically configured.

In one embodiment, the second identity is configured by a physical-layer signaling.

In one embodiment, the second identity is dynamically-configured.

In one embodiment, the second identity is an RNTI.

In one embodiment, the second identity is a C-RNTI.

In one embodiment, the second identity is a TC-RNTI.

In one embodiment, the second identity is a RA-RNTI.

In one embodiment, the second identity is an SI-RNTI.

In one embodiment, the second identity is a P-RNTI.

In one embodiment, the second identity is an integer no less than 0 and no greater than $2^{30}$.

In one embodiment, the second identity is a 16-bit binary non-negative integer.

In one embodiment, a number of bits occupied by the second identity is less than 9.

In one embodiment, a number of bits occupied by the second identity is less than 16.

In one embodiment, a number of bits occupied by the second identity is configurable.

In one embodiment, a number of bits occupied by the second identity is fixed.

In one embodiment, the first-type signaling monitored by the first node indicates the second identity, and the second-type signaling transmitted by the first node indicates the second identity.

In one embodiment, the first-type signaling monitored by the first node indicates the second identity, and the second-type signaling transmitted by the first node indicates the first identity.

In one embodiment, the first-type signaling monitored by the first node indicates the second identity, and the second-type signaling transmitted by the first node indicates the first identity and the second identity.

In one embodiment, the first-type signaling monitored by the first node indicates an identity of a transmitter of the third radio signal, and the second-type signaling transmitted by the first node indicates an identity of a transmitter of the third radio signal.

In one embodiment, the first-type signaling monitored by the first node indicates an identity of a transmitter of the third radio signal, and the second-type signaling transmitted by the first node indicates an identity of a transmitter of the second-type signaling.

In one embodiment, the first-type signaling monitored by the first node indicates an identity of a transmitter of the third radio signal, and the second-type signaling transmitted by the first node indicates an identity of a receiver of the third radio signal.

In one embodiment, the first-type signaling monitored by the first node indicates an identity of a transmitter of the third radio signal, and the second-type signaling transmitted by the first node indicates an identity of a transmitter of the second-type signaling and an identity of a transmitter of the third radio signal.

In one embodiment, the first-type signaling monitored by the first node indicates an identity of a transmitter of the third radio signal, and the second-type signaling transmitted by the first node indicates an identity of a receiver of the third radio signal and an identity of a transmitter of the third radio signal.

In one embodiment, the first-type signaling monitored by the first node comprises the second identity.

In one embodiment, the second identity is used for generating the first target sequence.

In one embodiment, the second identity is used for calculating a root sequence index of the first target sequence.

In one embodiment, the second identity is used for calculating a cyclic shift value of the first target sequence.

In one embodiment, the second identity is used for selecting the first target sequence out of a positive integer number of candidate target sequence(s), and the first target sequence is one of the positive integer number of candidate target sequence(s).

In one embodiment, the second identity is used for indicating an index of the first target sequence in the positive integer number of candidate target sequence(s).

In one embodiment, the second identity is used for determining a time-frequency position of the first-type signaling on the first radio resource.

In one embodiment, the second identity is used for determining a time-domain position of the first-type signaling on the first radio resource.

In one embodiment, the second identity is used for determining a frequency-domain position of the first-type signaling on the first radio resource.

In one embodiment, the second identity is used for determining spatial parameters of the first-type signaling on the first radio resource.

In one embodiment, the second identity is used for generating a scrambling sequence of the first-type signaling.

In one embodiment, the first-type signaling monitored by the first node comprises an identity of a transmitter of the third radio signal.

In one embodiment, the identity of a transmitter of the third radio signal is used for generating the first target sequence.

In one embodiment, the identity of a transmitter of the third radio signal is used for calculating a root sequence index of the first target sequence.

In one embodiment, the identity of a transmitter of the third radio signal is used for calculating a cyclic shift value of the first target sequence.

In one embodiment, the identity of a transmitter of the third radio signal is used for selecting the first target sequence out of a positive integer number of candidate target sequence(s), and the first target sequence is one of the positive integer number of candidate target sequence(s).

In one embodiment, the identity of a transmitter of the third radio signal is used for indicating an index of the first target sequence in the positive integer number of candidate signature sequence(s).

In one embodiment, the identity of a transmitter of the third radio signal is used for determining a time-frequency position of the first-type signaling on the first radio resource.

In one embodiment, the identity of a transmitter of the third radio signal is used for determining a time-domain position of the first-type signaling on the first radio resource.

In one embodiment, the identity of a transmitter of the third radio signal is used for determining a frequency-domain position of the first-type signaling on the first radio resource.

In one embodiment, the identity of a transmitter of the third radio signal is used for determining spatial parameters of the first-type signaling on the first radio resource.

In one embodiment, the identity of a transmitter of the third radio signal is used for generating a scrambling sequence of the first-type signaling.

In one embodiment, the second-type signaling transmitted by the first node comprises the second identity.

In one embodiment, the second identity is used for generating the first signature sequence.

In one embodiment, the second identity is used for calculating a root sequence index of the first signature sequence.

In one embodiment, the second identity is used for calculating a cyclic shift value of the first signature sequence.

In one embodiment, the second identity is used for selecting the first signature sequence out of a positive integer number of candidate signature sequence(s), and the first signature sequence is one of the positive integer number of candidate signature sequence(s).

In one embodiment, the second identity is used for indicating an index of the first signature sequence in the positive integer number of candidate signature sequence(s).

In one embodiment, the second identity is used for determining a time-frequency position of the second-type signaling on the second radio resource.

In one embodiment, the second identity is used for determining a time-domain position of the second-type signaling on the second radio resource.

In one embodiment, the second identity is used for determining a frequency-domain position of the second-type signaling on the second radio resource.

In one embodiment, the second identity is used for determining spatial parameters of the second-type signaling on the second radio resource.

In one embodiment, the second identity is used for generating a scrambling sequence of the second-type signaling.

In one embodiment, the second-type signaling transmitted by the first node comprises an identity of a transmitter of the third radio signal.

In one embodiment, the identity of a transmitter of the third radio signal is used for generating the first signature sequence.

In one embodiment, the identity of a transmitter of the third radio signal is used for calculating a root sequence index of the first signature sequence.

In one embodiment, the identity of a transmitter of the third radio signal is used for calculating a cyclic shift value of the first signature sequence.

In one embodiment, the identity of a transmitter of the third radio signal is used for selecting the first signature sequence out of a positive integer number of candidate signature sequence(s), and the first signature sequence is one of the positive integer number of candidate signature sequence(s).

In one embodiment, the identity of a transmitter of the third radio signal is used for indicating an index of the first signature sequence in the positive integer number of candidate signature sequence(s).

In one embodiment, the identity of a transmitter of the third radio signal is used for determining a time-frequency position of the second-type signaling on the second radio resource.

In one embodiment, the identity of a transmitter of the third radio signal is used for determining a time-domain position of the second-type signaling on the second radio resource.

In one embodiment, the identity of a transmitter of the third radio signal is used for determining a frequency-domain position of the second-type signaling on the second radio resource.

In one embodiment, the identity of a transmitter of the third radio signal is used for determining spatial parameters of the second-type signaling on the second radio resource.

In one embodiment, the identity of a transmitter of the third radio signal is used for generating a scrambling sequence of the second-type signaling.

In one embodiment, the second-type signaling transmitted by the first node explicitly indicates the fourth radio resource.

In one embodiment, an RE occupied by the second-type signaling transmitted by the first node implicitly indicates the fourth radio resource.

In one embodiment, the fourth radio-resource-pool comprises Q4 fourth-type radio resource(s), and the fourth radio resource is one of the Q4 fourth-type radio resource(s), Q4 being a positive integer.

In one embodiment, the second-type signaling comprises a second bitmap, the second bitmap comprises Q4 bit(s), and each of the Q4 bit(s) respectively corresponds to the Q4 fourth-type radio resource(s).

In one embodiment, the second-type signaling comprises a second bitmap, the second bitmap comprising Q4 bit(s), and one bit in the second bitmap corresponds to one of the Q4 fourth-type radio resource(s).

In one embodiment, the second-type signaling comprises a second bitmap, the second bitmap comprising Q4 bit(s); a given bit is any of the Q4 bit(s) in the second bitmap, and the given first bit is used for corresponding to a given fourth-type radio resource in the Q4 fourth-type radio resource(s); when the given first bit is equal to 1, the given fourth-type radio resource comprises the fourth radio resource.

In one embodiment, the second-type signaling comprises a second bitmap, the second bitmap comprising Q4 bit(s); a given bit is any of the Q4 bit(s) in the second bitmap, and the given first bit is used for corresponding to a given fourth-type radio resource in the Q4 fourth-type radio resource(s); when the given first bit is equal to 1, the given fourth-type radio resource is the fourth radio resource.

In one embodiment, the second-type signaling comprises an index of the fourth radio resource in the Q4 fourth-type radio resource(s).

In one embodiment, the second-type signaling indicates an index of the fourth radio resource in the Q4 fourth-type radio resource(s).

In one embodiment, the second-type signaling indicates time-frequency resources of the fourth radio resource.

In one embodiment, the second-type signaling indicates time-domain resources of the fourth radio resource.

In one embodiment, the second-type signaling indicates frequency-domain resources of the fourth radio resource.

In one embodiment, the second-type signaling indicates spatial resources of the fourth radio resource.

In one embodiment, the second-type signaling indicates code-domain resources of the fourth radio resource.

In one embodiment, the second-type signaling comprises Sidelink periodicity.

In one embodiment, the second-type signaling comprises UL/DL subframe configurations.

In one embodiment, the second-type signaling comprises UL/DL slot configurations.

In one embodiment, the second-type signaling comprises UL/DL symbol configurations.

In one embodiment, the second-type signaling indicates a slot format.

In one embodiment, the second-type signaling comprises a Radio Frame Number.

In one embodiment, the second-type signaling comprises a Subframe Number.

In one embodiment, the second-type signaling comprises Sidelink bandwidth.

In one embodiment, the second-type signaling comprises a Carrier Number.

In one embodiment, the second-type signaling indicates a carrier corresponding to the fourth radio resource.

In one embodiment, the second-type signaling comprises time-frequency resources of BWP.

In one embodiment, the second-type signaling comprises an index of BWP in a carrier.

In one embodiment, the second-type signaling comprises a minimum PRB index of the fourth radio resource.

In one embodiment, the second-type signaling indicates a number of PRBs comprised in the fourth radio resource.

In one embodiment, the second-type signaling indicates a maximum number of PRBs for transmitting radio signals on the fourth radio resource.

In one embodiment, the second-type signaling indicates an SCS of radio signals transmitted on the fourth radio resource.

In one embodiment, the second-type signaling indicates a center frequency and bandwidth of the fourth radio resource.

In one embodiment, the second-type signaling indicates a lowest frequency point and a highest frequency point of the fourth radio resource.

In one embodiment, the second-type signaling indicates a lowest frequency point and a bandwidth of frequency-domain resources occupied by the fourth radio resource.

In one embodiment, the fourth-type signaling indicates a slot for transmitting a radio signal on the fourth radio resource.

In one embodiment, the second-type signaling indicates an earliest time of time-domain resources occupied by a fourth radio resource.

In one embodiment, the second-type signaling indicates a latest time of time-domain resources occupied by a fourth radio resource.

In one embodiment, the second-type signaling indicates an earliest time and a duration of time-domain resources occupied by a fourth radio resource.

In one embodiment, the second-type signaling comprises one antenna port group.

In one embodiment, the second-type signaling comprises an antenna port index.

In one embodiment, the second-type signaling indicates spatial parameters for transmitting a radio signal on the fourth radio resource.

Embodiment 7

Figure 7:
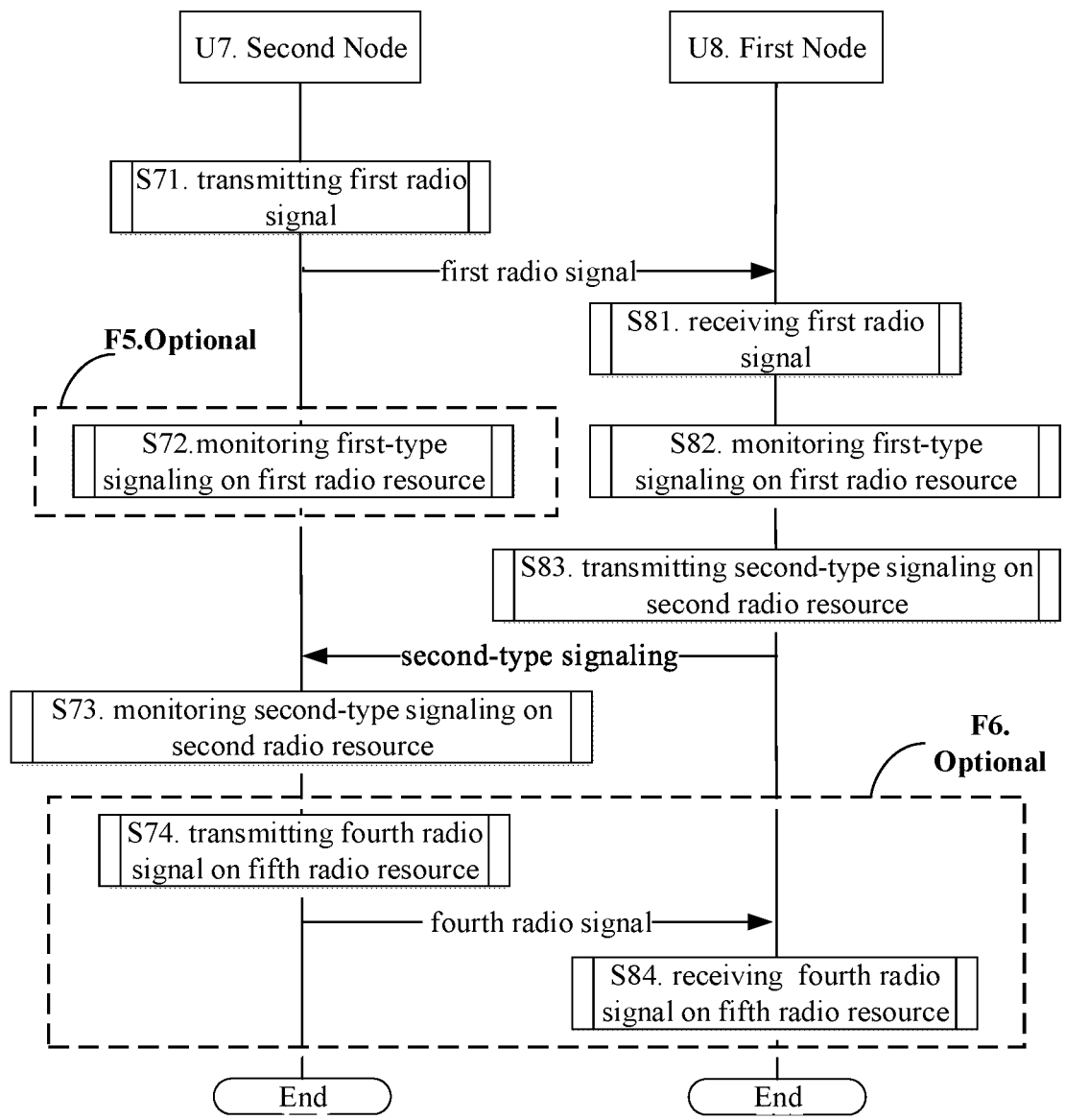
FIG. 7 illustrates a flowchart of a radio signal transmission according to one embodiment of the present disclosure.

Embodiment 7 illustrates a flowchart of a radio signal transmission according to one embodiment in the present disclosure, as shown in FIG. 7. In FIG. 7, a second node U7 and a first node U8 are communication nodes transmitted through Sidelink. In FIG. 7, steps in dot-framed boxes F5 and F6 are respectively optional.

The second node U7 transmits a first radio signal in step S71; monitors a first-type signaling on a first radio resource in step S72, or, monitors a second-type signaling on a second radio resource in step S73; and transmits a fourth radio signal on a fifth radio resource in step S74.

The first node U8 receives a first radio signal in step S81; monitors a first-type signaling on a first radio resource in step S82; transmits a second-type signaling on a second radio resource in step S83; and receives a fourth radio signal on a fifth radio resource in step S84.

In Embodiment 7, the first-type signaling is used for indicating that the first radio signal is correctly received by a receiver of the first radio signal; the second-type signaling is used for indicating that the first radio signal is not correctly received by a receiver of the first radio signal; time-domain resources occupied by the first radio resource and time-domain resources occupied by the second radio resource are orthogonal; a first bit block is used for generating the first radio signal, and the first bit block is used for generating the fourth radio signal; and the second-type signaling transmitted by the first node is used for indicating the fifth radio resource.

In one embodiment, when the second node detects the second-type signaling on the second radio resource, steps in the box F6 in FIG. 7 exist.

In one embodiment, when the second node does not detect the second-type signaling on the second radio resource, steps in the box F6 in FIG. 7 does not exist.

In one embodiment, steps in boxes F5 and F6 in FIG. 7 exist.

In one embodiment, steps in boxes F5 and F6 in FIG. 7 do not exist.

In one embodiment, steps in boxes F5 and F6 in FIG. 7 exist.

In one embodiment, the second node monitors the first-type signaling on the first radio resource and monitors the second-type signaling on the second radio resource.

In one embodiment, the second node monitors a second-type signaling only on the second radio resource.

In one embodiment, whether the second node monitors the first-type signaling on the first radio resource is implementation-related to the second node.

In one embodiment, when the second node does not detect the second-type signaling on the second radio resource, the second node drops transmission of the fourth radio signal on the fifth radio resource.

In one embodiment, the fourth radio signal comprises the second-type signal in the present disclosure.

In one embodiment, the fourth radio signal comprises the third-type signal in the present disclosure.

In one embodiment, the fourth radio signal is transmitted on the second-type channel in the present disclosure.

In one embodiment, the fourth radio signal is transmitted on the third-type channel in the present disclosure.

In one embodiment, the fourth radio signal comprises all or part of bits in a first bit block.

In one embodiment, the fourth radio signal is obtained by all or part of bits of the first bit block through the first preprocessing in the present disclosure.

In one embodiment, the fourth radio signal is obtained by all or part of bits of the first bit block through the second preprocessing in the present disclosure.

In one embodiment, the fourth radio signal is an output of all or part of bits of the first bit block through the first preprocessing in the present disclosure.

In one embodiment, the fourth radio signal is an output of all or part of bits of the first bit block through the second preprocessing in the present disclosure.

In one embodiment, only the first bit block is used to generate the fourth radio signal.

In one embodiment, there exists a CB other than the first bit block also being used for generating the fourth radio signal.

In one embodiment, the fifth radio resource is the fourth radio resource.

In one embodiment, the fourth radio signal is the third radio signal.

In one embodiment, the first radio signal comprises first control information in the present disclosure.

In one embodiment, the first control information is all or part of a higher-layer signaling.

In one embodiment, the first control information comprises all or part of an RRC signaling.

In one embodiment, the first control information comprises one or more fields of an RRC IE.

In one embodiment, the first control information comprises all or part of a MAC layer signaling.

In one embodiment, the first control information comprises one or more fields of a MAC CE.

In one embodiment, the first control information comprises one or more fields of a PHY layer.

In one embodiment, the first control information comprises one or more fields of one piece of UCI.

In one embodiment, the first control information comprises one or more fields of one piece of SCI.

In one embodiment, the first control information comprises one or more fields of an MIB.

In one embodiment, the first control information comprises one or more fields of an MIB-SL.

In one embodiment, the first control information comprises one or more fields of an MIB-V2X-SL.

In one embodiment, the first control information comprises one or more fields in an SIB.

In one embodiment, the first control information comprises one or more fields of an RMSI.

In one embodiment, the first control information comprises one or more fields of one piece of OSI.

In one embodiment, the first control information comprises one or more fields of SCI format.

In one embodiment, the first control information comprises a second bit block, and the second bit block comprises a positive integer number of sequentially-arranged bits.

In one embodiment, the first control information is used for generating a demodulating reference signal of the first radio signal.

In one embodiment, the first control information is used for scrambling the first radio signal.

In one embodiment, the first control information is used for generating a CRC attachment of the first radio signal.

In one embodiment, the first control information explicitly indicates the fifth radio resource.

In one embodiment, an RE set occupied by the first control information implicitly indicates the fifth radio resource.

In one embodiment, the fifth radio resource comprises Q5 fifth-type radio resource(s), the fifth radio resource is one of the Q5 fifth-type radio resource(s), Q5 being a positive integer.

In one embodiment, the first control information comprises a fifth bitmap, the fifth bitmap comprising Q5 bit(s), and each of the Q5 bit(s) respectively corresponds to the Q5 fifth radio resource(s).

In one embodiment, the first control information comprises a fifth bitmap, the fifth bitmap comprising Q5 bit(s), and one bit in the fifth bitmap corresponds to one of the Q5 fifth radio resource(s).

In one embodiment, the first control information comprises a fifth bitmap, the fifth bitmap comprising Q5 bit(s); a given fifth bit is any of the Q5 bit(s) in the fifth bitmap, and the given fifth bit is used for corresponding to a given fifth radio resource in the Q5 fifth-type radio resource(s); when the given fifth bit is equal to 1, the given fifth radio resource comprises the fifth radio resource.

In one embodiment, the first control information comprises a fifth bitmap, the fifth bitmap comprising Q5 bit(s); a given fifth bit is any of the Q5 bit(s) in the fifth bitmap, and the given fifth bit is used for corresponding to a given fifth radio resource in the Q5 fifth-type radio resource(s); when the given fifth bit is equal to 1, the given fifth radio resource is the fifth radio resource.

In one embodiment, the first control information comprises an index of the fifth radio resource in the Q5 fifth-type radio resource(s).

In one embodiment, the first control information indicates an index of the fifth radio resource in the Q5 fifth-type radio resource(s).

In one embodiment, the first control information indicates time-frequency resources of the fifth radio resource.

In one embodiment, the first control information indicates time-domain resources of the fifth radio resource.

In one embodiment, the first control information indicates frequency-domain resources of the fifth radio resource.

In one embodiment, the first control information indicates spatial resources of the fifth radio resource.

In one embodiment, the first control information indicates code-domain resources of the fifth radio resource.

In one embodiment, the first control information comprises Sidelink periodicity.

In one embodiment, the first control information comprises UL/DL subframe configurations.

In one embodiment, the first control information comprises UL/DL slot configurations.

In one embodiment, the first control information comprises UL/DL symbol configurations.

In one embodiment, the first control information indicates a slot format.

In one embodiment, the first control information comprises a Radio Frame Number.

In one embodiment, the first control information comprises a Subframe Number.

In one embodiment, the first control information comprises Sidelink bandwidth.

In one embodiment, the first control information comprises a Carrier Number.

In one embodiment, the first control information indicates a carrier corresponding to the fifth radio resource.

In one embodiment, the first control information comprises time-frequency resources of BWP.

In one embodiment, the first control information comprises an index of BWP in a carrier.

In one embodiment, the first control information comprises a minimum PRB index of the fifth radio resource.

In one embodiment, the first control information indicates a number of PRBs comprised in the fifth radio resource.

In one embodiment, the first control information indicates a maximum number of PRBs for transmitting radio signals on the fifth radio resource.

In one embodiment, the first control information indicates an SCS of radio signals transmitted on the fifth radio resource.

In one embodiment, the first control information indicates a center frequency and bandwidth of the fifth radio resource.

In one embodiment, the first control information indicates a lowest frequency point and a highest frequency point of the fifth radio resource.

In one embodiment, the first control information indicates a lowest frequency point and a bandwidth of frequency-domain resources occupied by the fifth radio resource.

In one embodiment, the first control information indicates a slot on the fifth radio resource used for transmitting a radio signal.

In one embodiment, the first control information indicates an earliest time of time-domain resources occupied by a fifth radio resource.

In one embodiment, the first control information indicates a latest time of time-domain resources occupied by a fifth radio resource.

In one embodiment, the first control information indicates an earliest time and a duration of time-domain resources occupied by a fifth radio resource.

In one embodiment, the first control information comprises one antenna port group.

In one embodiment, the first control information comprises an antenna port index.

In one embodiment, the first control information indicates spatial parameters for transmitting a radio signal on the fifth radio resource.

In one embodiment, the second-type signaling detected by the second node explicitly indicates the fifth radio resource.

In one embodiment, an RE set occupied by the second-type signaling detected by the second node implicitly indicates the fifth radio resource.

In one embodiment, the second-type signaling detected by the second node comprises a sixth bitmap, the sixth bitmap comprising Q5 bit(s), and each of the Q5 bit(s) respectively corresponds to the Q5 fifth-type radio resource(s).

In one embodiment, the second-type signaling detected by the second node comprises a sixth bitmap, the sixth bitmap comprising Q5 bit(s), and one bit in the sixth bitmap corresponding to one of the Q5 fifth radio resource(s).

In one embodiment, the second-type signaling detected by the second node comprises a sixth bitmap; the sixth bitmap comprising Q5 bit(s), and a given sixth bit is any of the Q5 bit(s) in the sixth bitmap, the given sixth bit is used for corresponding to a given fifth-type radio resource in the Q5 fifth-type radio resource(s); when the given sixth bit is equal to 1, the given fifth-type radio resource comprises the fifth radio resource.

In one embodiment, the second-type signaling detected by the second node comprises a sixth bitmap, the sixth bitmap comprising Q5 bit(s); a given sixth bit is any of the Q5 bit(s) in the sixth bitmap, and the given sixth bit is used for corresponding to a given fifth-type radio resource in the Q5 fifth-type radio resource(s); when the given sixth bit is equal to 1, the given fifth-type radio resource is the fifth radio resource.

In one embodiment, the second-type signaling detected by the second node comprises an index of the fifth radio resource on the Q5 fifth-type radio resource(s).

In one embodiment, the second-type signaling detected by the second node indicates an index of the fifth radio resource on the Q5 fifth-type radio resource(s).

In one embodiment, the second-type signaling detected by the second node indicates time-frequency resources of the fifth radio resource.

In one embodiment, the second-type signaling detected by the second node indicates time-domain resources of the fifth radio resource.

In one embodiment, the second-type signaling detected by the second node indicates frequency-domain resources of the fifth radio resource.

In one embodiment, the second-type signaling detected by the second node indicates spatial resources of the fifth radio resource.

In one embodiment, the second-type signaling detected by the second node indicates code-domain resources of the fifth radio resource.

In one embodiment, the second-type signaling detected by the second node comprises Sidelink periodicity.

In one embodiment, the second-type signaling detected by the second node comprises UL/DL subframe configurations.

In one embodiment, the second-type signaling detected by the second node comprises UL/DL slot configurations.

In one embodiment, the second-type signaling detected by the second node comprises UL/DL symbol configurations.

In one embodiment, the second-type signaling detected by the second node indicates a slot format.

In one embodiment, the second-type signaling detected by the second node comprises a Radio Frame Number.

In one embodiment, the second-type signaling detected by the second node comprises a Subframe Number.

In one embodiment, the second-type signaling detected by the second node comprises Sidelink bandwidth.

In one embodiment, the second-type signaling detected by the second node comprises a Carrier Number.

In one embodiment, the second-type signaling detected by the second node indicates a carrier corresponding to fifth radio resource.

In one embodiment, the second-type signaling detected by the second node comprises time-frequency resources of BWP.

In one embodiment, the second-type signaling detected by the second node comprises an index of BWP in carrier.

In one embodiment, the second-type signaling detected by the second node comprises a minimum PRB index of the fifth radio resource.

In one embodiment, the second-type signaling detected by the second node indicates a number of PRBs comprised in the fifth radio resource.

In one embodiment, the second-type signaling detected by the second node indicates a maximum number of PRBs for transmitting a radio signal on the fifth radio resource.

In one embodiment, the second-type signaling detected by the second node indicates an SCS of radio signals transmitted on the fifth radio resource.

In one embodiment, the second-type signaling detected by the second node indicates a center frequency and bandwidth of the fifth radio resource.

In one embodiment, the second-type signaling detected by the second node indicates a lowest frequency point and a highest frequency point of the fifth radio resource.

In one embodiment, the second-type signaling detected by the second node indicates a lowest frequency point and a bandwidth of frequency-domain resources occupied by the fifth radio resource.

In one embodiment, the second-type signaling detected by the second node indicates a slot for transmitting a radio signal on the fifth radio resource.

In one embodiment, the second-type signaling detected by the second node indicates an earliest time of time-domain resources occupied by a fifth radio resource.

In one embodiment, the second-type signaling detected by the second node indicates a latest time of time-domain resources occupied by a fifth radio resource.

In one embodiment, the second-type signaling detected by the second node indicates an earliest time and a duration of time-domain resources occupied by a fifth radio resource.

In one embodiment, the second-type signaling detected by the second node comprises an antenna port group.

In one embodiment, the second-type signaling detected by the second node comprises an antenna port index.

In one embodiment, the second-type signaling detected by the second node indicates spatial parameters for transmitting a radio signal on the fifth radio resource.

In one embodiment, a third identity is used for identifying a transmitter of the first radio signal.

In one embodiment, the third identity is used for identifying the second node.

In one embodiment, the third identity is used for identifying a sequence of a radio signal.

In one embodiment, the third identity is used for generating a scrambling sequence for scrambling a radio signal.

In one embodiment, the third identity is configured by a higher-layer signaling.

In one embodiment, the third identity is semi-statically configured.

In one embodiment, the third identity is configured by a physical-layer signaling.

In one embodiment, the third identity is dynamically-configured.

In one embodiment, the third identity is an RNTI.

In one embodiment, the third identity is a C-RNTI.

In one embodiment, the third identity is a TC-RNTI.

In one embodiment, the third identity is an RA-RNTI.

In one embodiment, the third identity is an SI-RNTI.

In one embodiment, the third identity is a P-RNTI.

In one embodiment, the third identity is an integer no less than 0 and no greater than $2^{30}$.

In one embodiment, the third identity is a 16-bit binary non-negative integer.

In one embodiment, a number of bits occupied by the third identity is less than 9.

In one embodiment, a number of bits occupied by the third identity is less than 16.

In one embodiment, a number of bits occupied by the third identity is configurable.

In one embodiment, a number of bits occupied by the third identity is fixed.

In one embodiment, the first radio signal comprises second control information, the second control information being used for indicating the third identity.

In one embodiment, the first radio signal comprises second control information, the second control information indicating an identity of the second node.

In one embodiment, the second control information is all or part of a higher-layer signaling.

In one embodiment, the second control information comprises all or part of an RRC signaling.

In one embodiment, the second control information comprises one or more fields of an RRC IE.

In one embodiment, the second control information comprises all or part of a MAC layer signaling.

In one embodiment, the second control information comprises one or more fields of a MAC CE.

In one embodiment, the second control information comprises one or more fields of a PHY layer.

In one embodiment, the second control information comprises one or more fields of one piece of UCI.

In one embodiment, the second control information comprises one or more fields of one piece of SCI.

In one embodiment, the second control information comprises one or more fields of an MIB.

In one embodiment, the second control information comprises one or more fields of an MIB-SL.

In one embodiment, the second control information comprises one or more fields of an MIB-V2X-SL.

In one embodiment, the second control information comprises one or more fields in an SIB.

In one embodiment, the second control information comprises one or more fields of an RMSI.

In one embodiment, the second control information comprises one or more fields of one piece of OSI.

In one embodiment, the second control information comprises one or more fields of SCI format.

In one embodiment, the second control information comprises a third bit block, the third bit block comprising a positive integer number of sequentially-arranged bits.

In one embodiment, the second control information is used for generating a demodulating reference signal of the first radio signal.

In one embodiment, the second control information is used for scrambling the first radio signal.

In one embodiment, the second control information is used for generating a CRC attachment of the first radio signal.

In one embodiment, the second-type signaling transmitted by the first node comprises the third identity.

In one embodiment, the second-type signaling monitored by the second node comprises the third identity.

In one embodiment, the second-type signaling detected by the second node comprises an identity of the second node.

In one embodiment, the first node does not detect the first-type signaling on the first radio resource, the first node transmits the second-type signaling on the second radio resource, and the second-type signaling transmitted by the first node comprises the third identity.

In one embodiment, the first node does not detect the first-type signaling on the first radio resource, the first node transmits the second-type signaling on the second radio resource, and the second-type signaling transmitted by the first node comprises an identity of the second node.

In one embodiment, the second node does not detect the first-type signaling on the first radio resource, the second node detects the second-type signaling on the second radio resource, and the second-type signaling detected by the second node comprises the third identity.

In one embodiment, the second node does not detect the first-type signaling on the first radio resource, the second node detects the second-type signaling on the second radio resource, and the second-type signaling detected by the second node comprises an identity of the second node.

Embodiment 8

Figure 8:
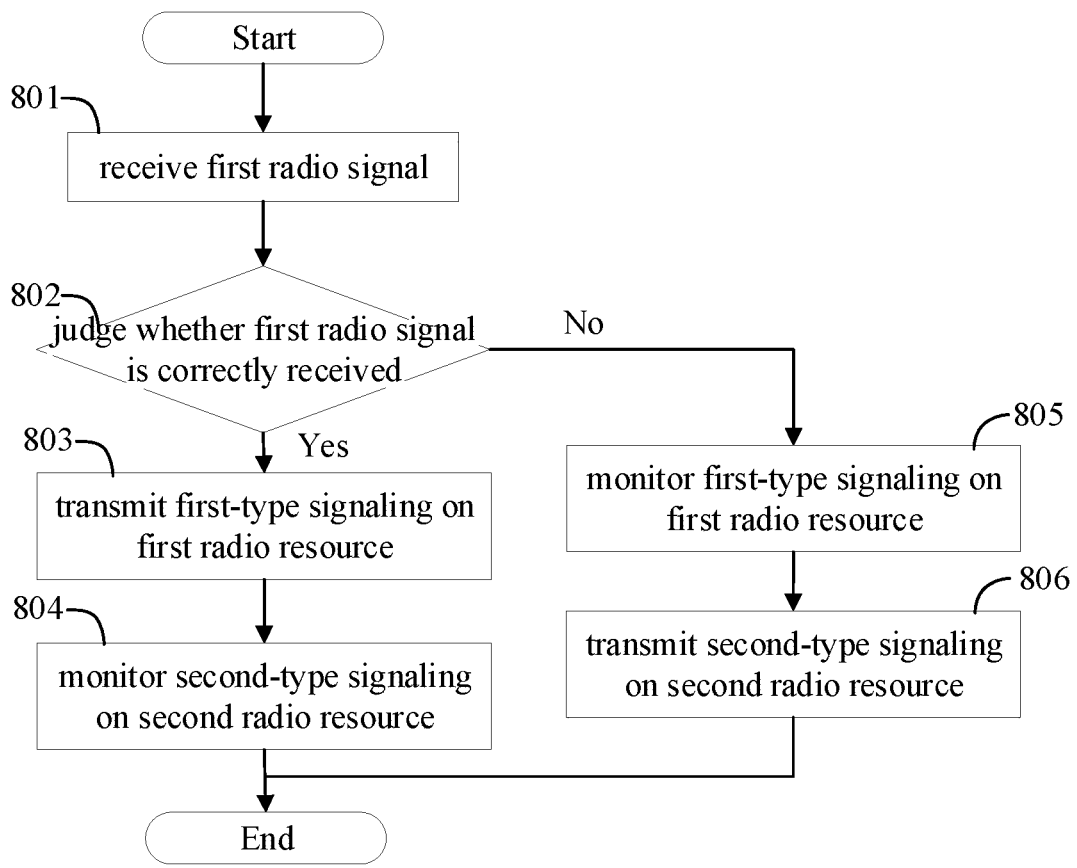
FIG. 8 illustrates a flowchart of determining a transmission of a first-type signaling or a second-type signaling according to one embodiment of the present disclosure.

Embodiment 8 illustrates a flowchart of determining a transmission of a first-type signaling or a second-type signaling according to one embodiment of the present disclosure, as shown in FIG. 8.

In Embodiment 8, a first node in the present disclosure receives a first radio signal in the present disclosure, and judges whether the first radio signal is correctly received by the first node; when the first radio signal is correctly received, the first node transmits a first-type signaling in the present disclosure on a first radio resource in the present disclosure, and monitors a second-type signaling in the present disclosure on a second radio resource in the present disclosure; when the first radio signal is not correctly received, the first node monitors the first-type signaling on the first radio resource, and transmits the second-type signaling on the second radio resource.

In one embodiment, the monitoring means a blind detection-based reception, that is, the first node receives a signal on the first radio resource and performs decoding operation; when the decoding according to a CRC bit is correct, it is judged that the first-type signaling is detected on the first radio resource; otherwise it is judged that the first-type signaling is not detected on the first radio resource.

In one embodiment, the monitoring means a coherent detection-based reception, that is, the first node performs a coherent reception on the first radio resource with an RS sequence corresponding to a DMRS of the first-type signaling, and measures energy of a signal obtained after the coherent reception; when the energy of a signal obtained after the coherent reception is greater than a third given threshold, it is judged that the first-type signaling is detected on the first radio resource; otherwise it is judged that the first-type signaling is not detected on the first radio resource.

In one embodiment, the monitoring means an energy detection-based reception, that is, the first node senses energy of a radio signal on the first radio resource and average it on time to obtain received energy; when the received energy is greater than a fourth given threshold, it is judged that the first-type signaling is detected on the first radio resource; otherwise it is judged that the first-type signaling is not detected on the first radio resource.

In one embodiment, the monitoring means a blind detection-based reception, that is, the first node receives a signal on the second radio resource and performs decoding operation; when the decoding according to a CRC bit is correct, it is judged that the second-type signaling is detected on the second radio resource; otherwise it is judged that the second-type signaling is not detected on the second radio resource.

In one embodiment, the monitoring means a coherent detection-based reception, that is, the first node performs a coherent reception on the second radio resource with an RS sequence corresponding to a DMRS of the second-type signaling, and measures energy of a signal obtained after the coherent reception; when the energy of a signal obtained after the coherent reception is greater than a fifth given threshold, it is judged that the second-type signaling is detected on the second radio resource; otherwise it is judged that the second-type signaling is not detected on the second radio resource.

In one embodiment, the monitoring means an energy detection-based reception, that is, the first node senses energy of a radio signal on the second radio resource and averages it on time to obtain received energy; when the received energy is greater than a sixth given threshold, it is judged that the second-type signaling is successfully received on the second radio resource; otherwise it is judged that the second-type signaling is not successfully received on the second radio resource.

Embodiment 9

Figure 9:
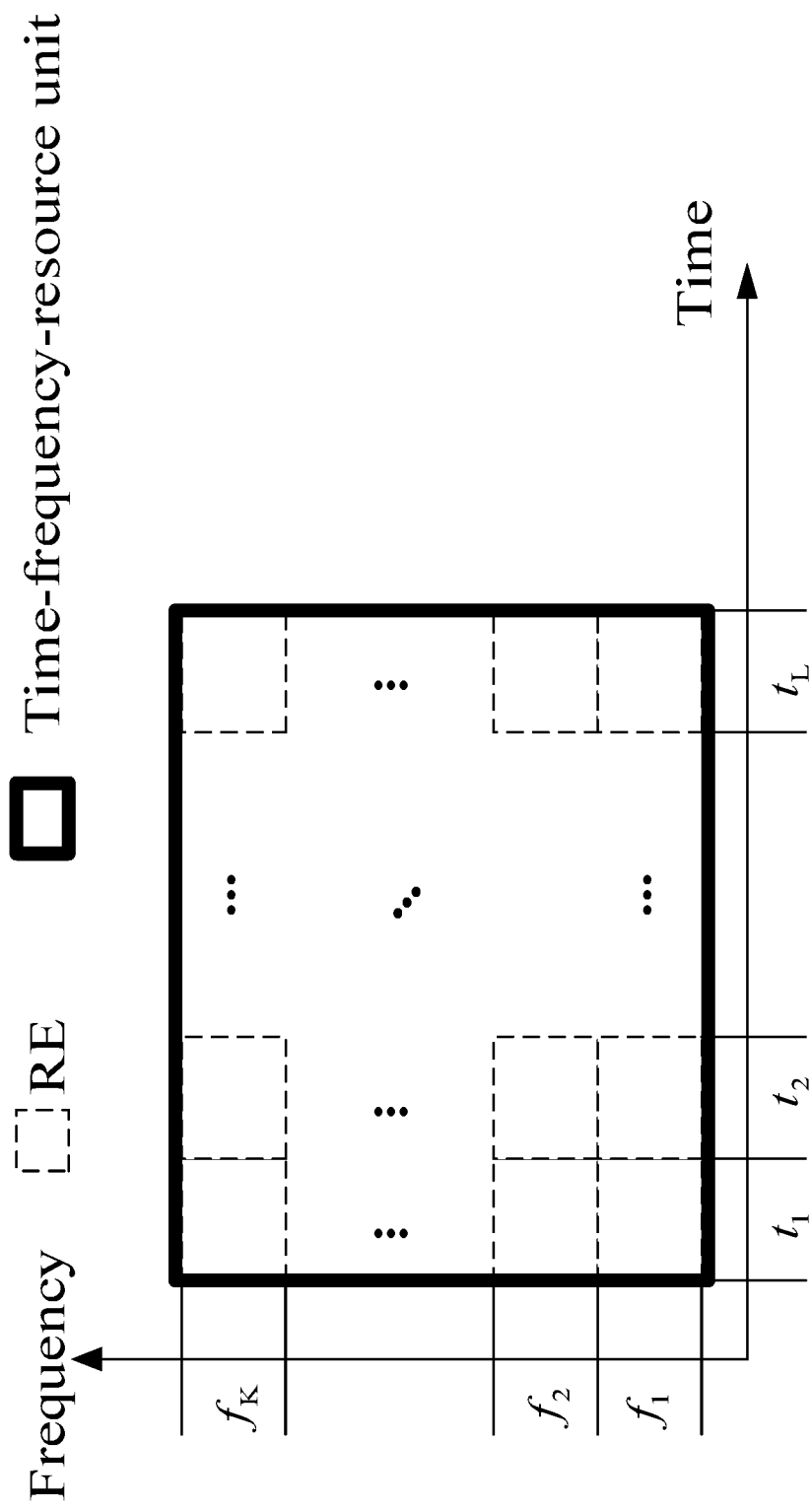
FIG. 9 illustrates a schematic diagram of a time-frequency resource unit according to one embodiment of the present disclosure.

Embodiment 9 illustrates a schematic diagram of a time-frequency resource unit according to one embodiment of the present disclosure, as shown in FIG. 9. In FIG. 9, a dotted small box represents a Resource Element (RE), and a bold-line box represents a time-frequency resource unit. In FIG. 9, a time-frequency resource unit occupies K subcarrier(s) in frequency domain, and L multicarrier symbol(s) in time domain, K and L being positive integers. In FIG. 9, t1, t2, . . . tL represent(s) the L symbol(s), and f1, f2, . . . , fK represent(s) the K subcarrier(s).

In Embodiment 9, a time-frequency resource unit occupies K subcarrier(s) in frequency domain, and L multicarrier symbol(s) in time domain, K and L being positive integers.

In one embodiment, the K is equal to 12.
In one embodiment, the K is equal to 72.
In one embodiment, the K is equal to 127.
In one embodiment, the K is equal to 240.
In one embodiment, the L is equal to 1.
In one embodiment, the L is equal to 2.
In one embodiment, the L is no greater than 14.
In one embodiment, any of the L multicarrier symbol(s) is at least one of a Frequency Division Multiple Access (FDMA), an Orthogonal Frequency Division Multiplexing (OFDM), a Single-Carrier Frequency Division Multiple Access (SC-FDMA), a Discrete Fourier Transform Spread Orthogonal Frequency Division Multiplexing (DFTS-OFDM), a Filter Bank Multi-Carrier (FBMC), an Interleaved Frequency Division Multiple Access (IFDMA).

In one embodiment, the time-frequency resource unit comprises R RE(s), R being a positive integer.

In one embodiment, the time-frequency resource unit consists of R RE(s), R being a positive integer.

In one embodiment, any of the R RE(s) occupies a multicarrier symbol in time domain and a subcarrier in frequency domain.

In one embodiment, an SCS of the RE is measured by Hertz (Hz).

In one embodiment, an SCS of the RE is measured by Kilohertz (kHz).

In one embodiment, an SCS of the RE is measured by Megahertz (MHz).

In one embodiment, a symbol length of a multicarrier symbol of the RE is measured by sampling point.

In one embodiment, a symbol length of a multicarrier symbol of the RE is measured by μs.

In one embodiment, a symbol length of a multicarrier symbol of the RE is measured by ms.

In one embodiment, an SCS of the RE is at least one of 1.25 kHz, 2.5 kHz, 5 kHz, 15 kHz, 30 kHz, 60 kHz, 120 kHz or 240 kHz.

In one embodiment, a product of the K and the L of the time-frequency resource unit is no less than the R.

In one embodiment, the time-frequency resource unit does not comprise an RE allocated to a Guard Period (GP).

In one embodiment, the time-frequency resource unit does not comprise a RE allocated to a Reference Signal (RS).

In one embodiment, the time-frequency resource unit does not comprise an RE allocated to the first-type signal in the present disclosure.

In one embodiment, the time-frequency resource unit does not comprise an RE allocated to the first-type channel in the present disclosure.

In one embodiment, the time-frequency resource unit does not comprise an RE allocated to the second-type signal in the present disclosure.

In one embodiment, the time-frequency resource unit does not comprise an RE allocated to the second-type channel in the present disclosure.

In one embodiment, the time-frequency resource unit comprises a positive integer number of Resource Block(s) (RB).

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s)

In one embodiment, the time-frequency resource unit belongs to one PRB.

In one embodiment, the time-frequency resource unit is equal to one PRB in frequency domain.

In one embodiment, the time-frequency resource unit comprises a positive integer number of Virtual Resource Block(s) (VRB).

In one embodiment, the time-frequency resource unit belongs to one VRB.

In one embodiment, the time-frequency resource unit is equal to one VRB in frequency domain.

In one embodiment, the time-frequency resource unit comprises a positive integer number of Physical Resource Block (PRB) pair(s).

In one embodiment, the time-frequency resource unit belongs to one PRB pair.

In one embodiment, the time-frequency resource unit is equal to one PRB pair in frequency domain.

In one embodiment, the time-frequency resource unit comprises a positive integer number of frame(s).

In one embodiment, the time-frequency resource unit belongs to one frame.

In one embodiment, the time-frequency resource unit is equal to one frame in time domain.

In one embodiment, the time-frequency resource unit comprises a positive integer number of subframe(s).

In one embodiment, the time-frequency resource unit belongs to one sub frame.

In one embodiment, the time-frequency resource unit is equal to one subframe in time domain.

In one embodiment, the time-frequency resource unit comprises a positive integer number of slot(s).

In one embodiment, the time-frequency resource unit belongs to one slot.

In one embodiment, the time-frequency resource unit is equal to one slot in time domain.

In one embodiment, the time-frequency resource unit comprises a positive integer number of Symbol(s).

In one embodiment, the time-frequency resource unit belongs to one Symbol.

In one embodiment, the time-frequency resource unit is equal to one Symbol in time domain.

In one embodiment, the time-frequency resource unit belongs to the third-type signal in the present disclosure.

In one embodiment, the time-frequency resource unit belongs to the third-type channel in the present disclosure.

Embodiment 10

Figure 10:
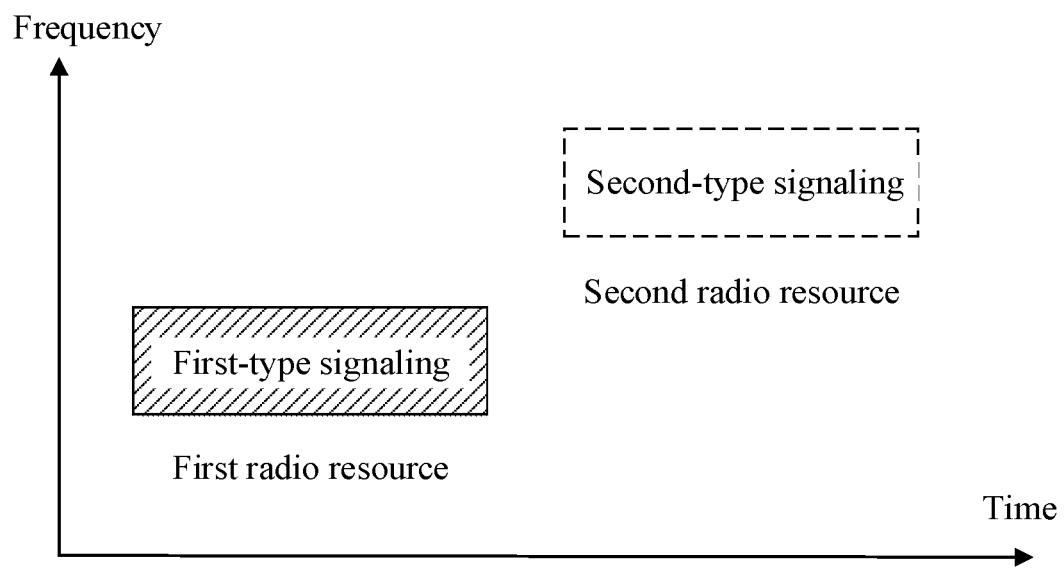
FIG. 10 illustrates a schematic diagram of a relationship between a first radio resource and a second radio resource according to one embodiment of the present disclosure.

Embodiment 10 illustrates a schematic diagram of a relationship between a first radio resource and a second radio resource according to one embodiment of the present disclosure, as shown in FIG. 10. In FIG. 10, the solid-line-framed rectangle represents a first radio resource in the present disclosure, a dot-line-framed rectangle represents a second radio resource in the present disclosure, a slash-filled rectangle represents a first-type signaling in the present disclosure, and an unfilled rectangle represents a second-type signaling in the present disclosure.

In Embodiment 10, the first-type signaling is transmitted on the first radio resource, and the second-type signaling is transmitted on the second radio resource; time-domain resources occupied by the first radio resource and time-domain resources occupied by the second radio resource are orthogonal.

In one embodiment, the first radio resource comprises a positive integer number of time-frequency resource unit(s).

In one embodiment, the first radio resource belongs to a Carrier.

In one embodiment, the first radio resource belongs to a BWP.

In one embodiment, the first radio resource comprises a BWP.

In one embodiment, the first radio resource comprises a positive integer number of BWP(s).

In one embodiment, the first radio resource comprises an UL multicarrier symbol and a DL multicarrier symbol.

In one embodiment, the first radio resource comprises an UL multicarrier symbol, a DL multicarrier symbol and a Sidelink multicarrier symbol.

In one embodiment, the first radio resource comprises an UL multicarrier symbol.

In one embodiment, the first radio resource only comprises a DL multicarrier symbol.

In one embodiment, the first radio resource only comprises an UL multicarrier symbol.

In one embodiment, the first radio resource only comprises a Sidelink multicarrier symbol.

In one embodiment, the first radio resource comprises a positive integer number of time unit(s) in time domain.

In one embodiment, the time unit is at least one of a radio frame, a slot, a subframe, a sub-slot, a mini-slot and a multicarrier symbol.

In one embodiment, the first radio resource comprises a positive integer number of frequency unit(s) in frequency domain.

In one embodiment, the frequency unit is at least one of a carrier, a BWP, a PRB, an RB, and a subcarrier.

In one embodiment, the first radio resource comprises a positive integer number of time-frequency resource unit(s).

In one embodiment, at least two the time-frequency resource units comprised in the first radio resource are orthogonal in time domain.

In one embodiment, at least two the time-frequency resource units comprised in the first radio resource are orthogonal in frequency domain.

In one embodiment, at least two the time-frequency resource units comprised in the first radio resource are consecutive in time domain.

In one embodiment, at least two the time-frequency resource units comprised in the first radio resource are discrete in time domain.

In one embodiment, at least two the time-frequency resource units comprised in the first radio resource are consecutive in frequency domain.

In one embodiment, at least two the time-frequency resource units comprised in the first radio resource are discrete in frequency domain.

In one embodiment, the first radio resource comprises consecutive the frequency-domain units in frequency domain.

In one embodiment, the first radio resource comprises discrete the frequency-domain units in frequency domain.

In one embodiment, the first radio resource comprises consecutive the time-domain units in time domain.

In one embodiment, the first radio resource comprises discrete the time-domain units in time domain.

In one embodiment, the second radio resource comprises a positive integer number of time-frequency resource unit(s).

In one embodiment, the second radio resource belongs to a carrier.

In one embodiment, the second radio resource belongs to a BWP.

In one embodiment, the second radio resource belongs to a BWP.

In one embodiment, the second radio resource comprises a positive integer number of BWP(s).

In one embodiment, the second radio resource comprises an UL multicarrier symbol and a DL multicarrier symbol.

In one embodiment, the second radio resource comprises an UL multicarrier symbol, a DL multicarrier symbol and a Sidelink multicarrier symbol.

In one embodiment, the second radio resource comprises an UL multicarrier symbol.

In one embodiment, the second radio resource only comprises a DL multicarrier symbol.

In one embodiment, the second radio resource only comprises an UL multicarrier symbol.

In one embodiment, the second radio resource only comprises a Sidelink multicarrier symbol.

In one embodiment, the second radio resource comprises a positive integer number of the time unit(s) in time domain.

In one embodiment, the second radio resource comprises a positive integer number of the frequency unit(s) in frequency domain.

In one embodiment, the second radio resource comprises a positive integer number of time-frequency resource unit(s).

In one embodiment, at least two the time-frequency resource units comprised in the second radio resource are orthogonal in time domain.

In one embodiment, at least two the time-frequency resource units comprised in the second radio resource are orthogonal in frequency domain.

In one embodiment, at least two the time-frequency resource units comprised in the second radio resource are consecutive in time domain.

In one embodiment, at least two the time-frequency resource units comprised in the second radio resource are discrete in time domain.

In one embodiment, at least two the time-frequency resource units comprised in the second radio resource are consecutive in frequency domain.

In one embodiment, at least two the time-frequency resource units comprised in the second radio resource are discrete in frequency domain.

In one embodiment, the second radio resource comprises consecutive frequency-domain resources in frequency domain.

In one embodiment, the second radio resource comprises discrete frequency-domain resources in frequency domain.

In one embodiment, the second radio resource comprises consecutive time domain resources in time domain.

In one embodiment, the second radio resource comprises discrete time-domain resources in time domain.

In one embodiment, the third radio resource comprises a positive integer number of the time-frequency resource unit(s).

In one embodiment, the third radio resource belongs to a Carrier.

In one embodiment, the third radio resource belongs to a BWP.

In one embodiment, the third radio resource comprises a BWP.

In one embodiment, the third radio resource comprises a positive integer number of BWP(s).

In one embodiment, the third radio resource comprises an UL multicarrier symbol and a DL multicarrier symbol.

In one embodiment, the third radio resource comprises an UL multicarrier symbol, a DL multicarrier symbol and a Sidelink multicarrier symbol.

In one embodiment, the third radio resource comprises an UL multicarrier symbol.

In one embodiment, the third radio resource only comprises a DL multicarrier symbol.

In one embodiment, the third radio resource only comprises an UL multicarrier symbol.

In one embodiment, the third radio resource only comprises a Sidelink multicarrier symbol.

In one embodiment, the third radio resource comprises a positive integer number of the time unit(s) in time domain.

In one embodiment, the third radio resource comprises a positive integer number of the frequency unit(s) in frequency domain.

In one embodiment, the third radio resource comprises a positive integer number of the time-frequency resource unit(s).

In one embodiment, at least two the time-frequency resource units comprised in the third radio resource are orthogonal in time domain.

In one embodiment, at least two the time-frequency resource units comprised in the third radio resource are orthogonal in frequency domain.

In one embodiment, at least two the time-frequency resource units comprised in the third radio resource are consecutive in time domain.

In one embodiment, at least two the time-frequency resource units comprised in the third radio resource are discrete in time domain.

In one embodiment, at least two the time-frequency resource units comprised in the third radio resource are consecutive in frequency domain.

In one embodiment, at least two the time-frequency resource units comprised in the third radio resource are discrete in frequency domain.

In one embodiment, the third radio resource comprises consecutive frequency-domain resources in frequency domain.

In one embodiment, the third radio resource comprises discrete frequency-domain resources in frequency domain.

In one embodiment, the third radio resource comprises consecutive time domain resources in time domain.

In one embodiment, the third radio resource comprises discrete time-domain resources in time domain.

In one embodiment, the fourth radio resource comprises a positive integer number of the time-frequency resource unit(s).

In one embodiment, the fourth radio resource belongs to a Carrier.

In one embodiment, the fourth radio resource belongs to a BWP.

In one embodiment, the fourth radio resource comprises a BWP.

In one embodiment, the fourth radio resource comprises a positive integer number of BWP(s).

In one embodiment, the fourth radio resource comprises an UL multicarrier symbol and a DL multicarrier symbol.

In one embodiment, the fourth radio resource comprises an UL multicarrier symbol, a DL multicarrier symbol and a Sidelink multicarrier symbol.

In one embodiment, the fourth radio resource comprises an UL multicarrier symbol.

In one embodiment, the fourth radio resource only comprises a DL multicarrier symbol.

In one embodiment, the fourth radio resource only comprises an UL multicarrier symbol.

In one embodiment, the fourth radio resource only comprises a Sidelink multicarrier symbol.

In one embodiment, the fourth radio resource comprises a positive integer number of the time unit(s) in time domain.

In one embodiment, the fourth radio resource comprises a positive integer number of the frequency unit(s) in frequency domain.

In one embodiment, the fourth radio resource comprises a positive integer number of the time-frequency resource unit(s).

In one embodiment, at least two the time-frequency resource units in the fourth radio resource are orthogonal in time domain.

In one embodiment, at least two the time-frequency resource units in the fourth radio resource are orthogonal in frequency domain.

In one embodiment, at least two the time-frequency resource units in the fourth radio resource are consecutive in time domain.

In one embodiment, at least two the time-frequency resource units in the fourth radio resource are discrete in time domain.

In one embodiment, at least two the time-frequency resource units in the fourth radio resource are consecutive in frequency domain.

In one embodiment, at least two the time-frequency resource units in the fourth radio resource are discrete in frequency domain.

In one embodiment, the fourth radio resource comprises consecutive frequency-domain resources in frequency domain.

In one embodiment, the fourth radio resource comprises discrete frequency-domain resources in frequency domain.

In one embodiment, the fourth radio resource comprises consecutive time domain resources in time domain.

In one embodiment, the fourth radio resource comprises discrete time-domain resources in time domain.

In one embodiment, the fifth radio resource comprises a positive integer number of time-frequency resource unit(s).

In one embodiment, the fifth radio resource belongs to a carrier.

In one embodiment, the fifth radio resource belongs to a BWP.

In one embodiment, the fifth radio resource comprises a BWP.

In one embodiment, the fifth radio resource comprises a positive integer number of BWP(s).

In one embodiment, the fifth radio resource comprises an UL multicarrier symbol and a DL multicarrier symbol.

In one embodiment, the fifth radio resource comprises an UL multicarrier symbol, a DL multicarrier symbol and a Sidelink multicarrier symbol.

In one embodiment, the fifth radio resource comprises an UL multicarrier symbol.

In one embodiment, the fifth radio resource only comprises a DL multicarrier symbol.

In one embodiment, the fifth radio resource only comprises an UL multicarrier symbol.

In one embodiment, the fifth radio resource only comprises a Sidelink multicarrier symbol.

In one embodiment, the fifth radio resource comprises a positive integer number of the time unit(s) in time domain.

In one embodiment, the fifth radio resource comprises a positive integer number of the frequency unit(s) in frequency domain.

In one embodiment, the fifth radio resource comprises a positive integer number of time-frequency resource unit(s).

In one embodiment, at least two the time-frequency resource units in the fifth radio resource are orthogonal in time domain.

In one embodiment, at least two the time-frequency resource units in the fifth radio resource are orthogonal in frequency domain.

In one embodiment, at least two the time-frequency resource units in the fifth radio resource are consecutive in time domain.

In one embodiment, at least two the time-frequency resource units in the fifth radio resource are discrete in time domain.

In one embodiment, at least two the time-frequency resource units in the fifth radio resource are consecutive in frequency domain.

In one embodiment, at least two the time-frequency resource units in the fifth radio resource are discrete in frequency domain.

In one embodiment, the fifth radio resource comprises consecutive frequency-domain resources in frequency domain.

In one embodiment, the fifth radio resource comprises discrete frequency-domain resources in frequency domain.

In one embodiment, the fifth radio resource comprises consecutive time domain resources in time domain.

In one embodiment, the fifth radio resource comprises discrete time-domain resources in time domain.

Embodiment 11

Figure 11:
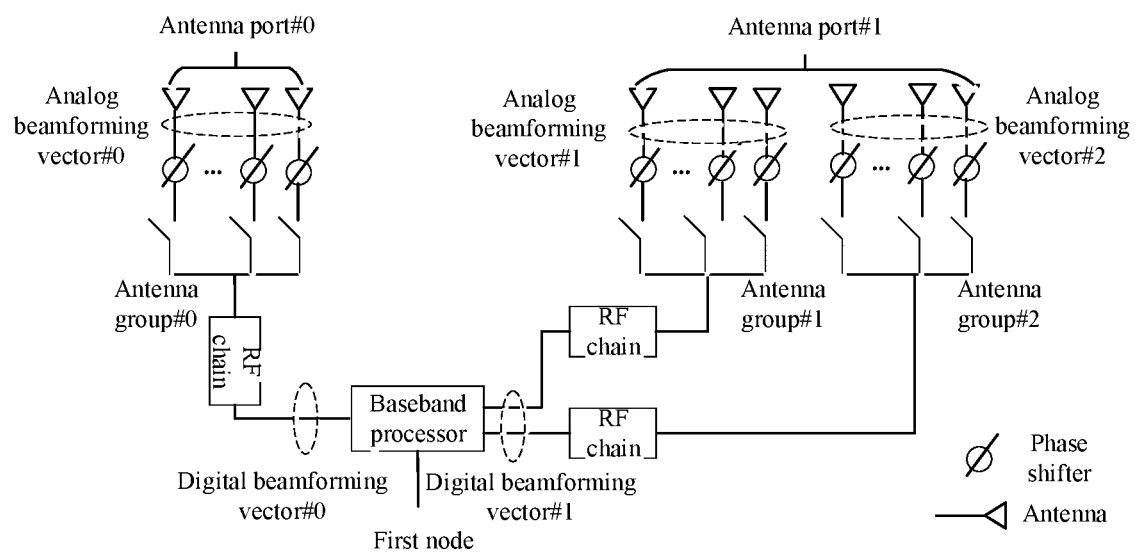
FIG. 11 illustrates a schematic diagram of a relationship between antenna ports and antenna groups according to one embodiment of the present disclosure.

Embodiment 11 illustrates a schematic diagram of relationships among antenna ports and antenna groups according to one embodiment of the present disclosure, as shown in FIG. 11.

In Embodiment 11, an antenna port group comprises a positive integer number of antenna port(s); an antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. A given antenna port is one antenna port in the one antenna port group, mapping coefficients of all antennas in a positive integer number of antenna group(s) comprised by the given antenna port to the given antenna port constitute a beamforming vector corresponding to the given antenna port. Mapping coefficients of multiple antennas in any given antenna group of a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is a product of an analog beamforming matrix corresponding to the given antenna port and a digital beamforming vector corresponding to the given antenna port.

FIG. 11 illustrates two antenna ports, namely, antenna port #0 and antenna port #1. Herein, the antenna port #0 consists of antenna group #0, and the antenna port #1 consists of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. A beamforming vector corresponding to the antenna port #0 is a product of the analog beamforming vector #0 and the digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to the antenna port #1 is a product of the digital beamforming vector #1 and an analog beamforming matrix formed by diagonally arranging of the analog beamforming vector #1 and the analog beamforming vector #2.

In one embodiment, an antenna port group comprises only one antenna port.

In one embodiment, an antenna port comprises only one antenna group, i.e., an RF chain, for instance, the antenna port #0 in FIG. 11.

In one subembodiment of the above embodiment, an analog beamforming matrix corresponding to the antenna port is dimensionally reduced to an analog beamforming vector, and a digital beamforming vector corresponding to the antenna port is dimensionally reduced to a scaler, and a beamforming vector corresponding to the antenna port is equivalent to an analog beamforming vector corresponding to the antenna port. For example, the antenna port #0 in FIG. 11 only comprises the antenna group #0, the digital beamforming vector #0 in FIG. 11 is dimensionally reduced to a scaler, and a beamforming vector corresponding to the antenna port #0 is the analog beamforming vector #0.

In one embodiment, an antenna port comprises a positive integer number of antenna group(s), that is, a positive integer number of RF chain(s), for example, the antenna port #1 in FIG. 11.

In one embodiment, the specific meaning of the antenna port can be found in 3GPP TS36.211, section 5.2 and section 6.2, or in 3GPP TS38.211, section 4.4

In one embodiment, small-scale channel parameters that a radio signal transmitted on one antenna port goes through can be used to infer small-scale channel parameters that another radio signal transmitted on the antenna port goes through.

In one subembodiment of the above embodiment, the small-scale channel parameters include one or more of a Channel Impulse Response (CIR), a Precoding Matrix Indicator (PMI), a Channel Quality Indicator (CQI) or a Rank Indicator (RI).

In one embodiment, two antenna ports being Quasi Co-Located (QCL) means that all or part of large-scale properties of a radio signal transmitted on one of the two antenna ports can be used to infer all or part of large-scale properties of a radio signal transmitted on the other of the two antenna ports.

In one embodiment, large-scale properties of a radio signal comprise one or more of delay spread, Doppler spread, Doppler shift, average gain, average delay or Spatial Rx parameters.

In one embodiment, the specific meaning of the QCL can be found in 3GPP TS36.211, section 6.2, 3GPP TS38.211, section 4.4 or 3GPP TS38.214, section 5.1.5.

In one embodiment, the phrase that a QCL type between two antenna ports is QCL-TypeD refers to that Spatial Rx parameters of a radio signal transmitted from the one antenna port can be used for inferring Spatial Rx parameters of a radio signal transmitted from the other antenna port.

In one embodiment, the phrase that a QCL type between two antenna ports is QCL-TypeD refers to that a radio signal transmitted by the one antenna port and a radio signal transmitted by the other antenna port can be received with same Spatial Rx parameters.

In one embodiment, the specific meaning of the QCL-TypeD can be found in 3GPP TS38.214, section 5.1.5.

In one embodiment, spatial parameters comprise one or more of beam direction, analog beamforming matrix, analog beamforming vector, digital beamforming vector, beamforming vector, and spatial domain filter.

In one embodiment, the spatial parameters comprise Spatial Tx parameters.

In one embodiment, the spatial parameters comprise Spatial Rx parameters.

In one embodiment, the spatial filter comprises Spatial Domain Transmission Filter.

In one embodiment, the spatial filter comprises Spatial Domain Reception Filter.

In one embodiment, a spatial parameter group comprises a positive integer number of spatial parameter(s).

In one embodiment, a spatial parameter group corresponds to a positive integer number of antenna port group(s).

In one embodiment, a spatial parameter group corresponds to the one antenna port group.

In one embodiment, a spatial parameter group comprises a positive integer number of antenna port(s).

Embodiment 12

Figure 12:
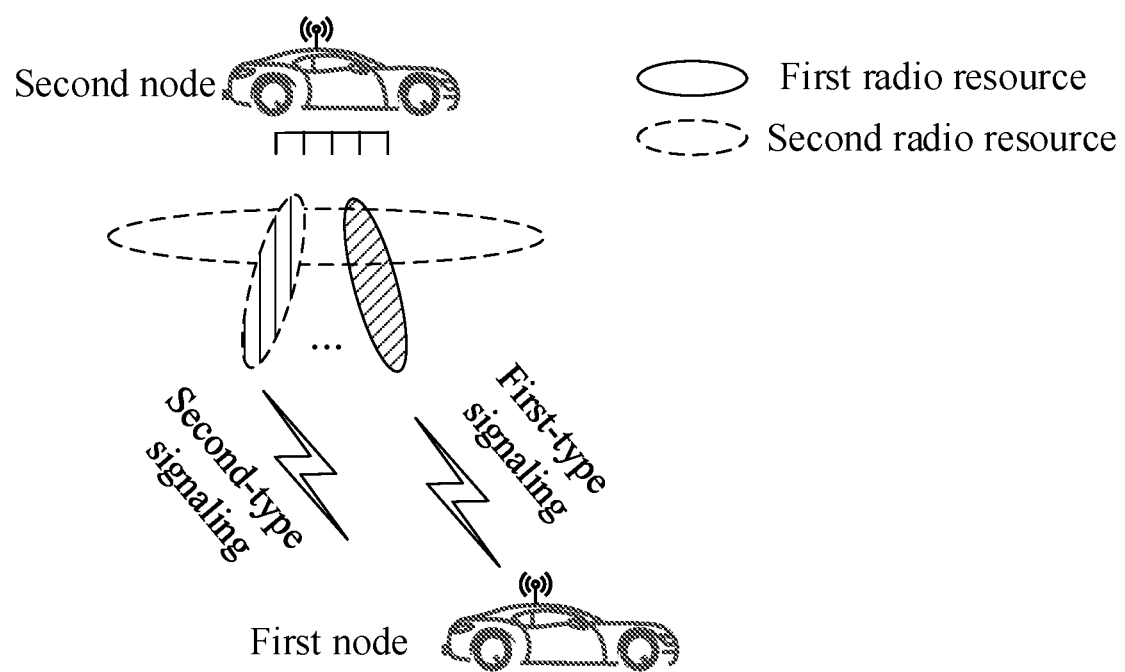
FIG. 12 illustrates a schematic diagram of a relationship between a first radio resource and a second radio resource according to one embodiment of the present disclosure.

Embodiment 12 illustrates a schematic diagram of a relationship between a first radio resource and a second radio resource according to one embodiment of the present disclosure, as shown in FIG. 12. In Embodiment 12, a solid-framed ellipse represents a first radio resource in the present disclosure, a dot-framed ellipse represents a second radio resource in the present disclosure, a slash-filled ellipse represents a first-type signaling in the present disclosure, and a vertical-line-filled ellipse represents a second-type signaling in the present disclosure.

In Embodiment 12, the first-type signaling is transmitted on the first radio resource, and the second-type signaling is transmitted on the second radio resource; time-domain resources occupied by the first radio resource and time-domain resources occupied by the second radio resource are orthogonal.

In one embodiment, the first radio resource belongs to a first spatial parameter group in space domain, and the first spatial parameter group is one of the N1 spatial parameter group(s); the first-type signaling is transmitted by the first spatial parameter group; N1 being a positive integer.

In one embodiment, the second radio resource belongs to a second spatial parameter group in space domain, and the second spatial parameter group is one of the N2 spatial parameter group(s); the second-type signaling is transmitted by the second spatial parameter group; N2 being a positive integer.

In one embodiment, all spatial parameters in the N1 spatial parameter group(s) correspond to one antenna port.

In one embodiment, each of the N1 spatial parameter group(s) respectively corresponds to N1 antenna port group(s).

In one embodiment, any two of the N1 radio resources belong to one spatial parameter group in space domain.

In one embodiment, each of the N1 first-type radio resource(s) respectively belongs to the N1 spatial parameter group(s) in space domain.

In one embodiment, any two radio resources of the N1 first-type radio resources belong to two spatial parameter groups in space domain, and belong to the same time-domain unit in time domain.

In one embodiment, any two radio resources of the N1 first-type radio resources belong to two spatial parameter groups in space domain, and belong to the same frequency-domain unit in frequency domain.

In one embodiment, any two radio resources of the N1 first-type radio resources belong to two spatial parameter groups in space domain, and comprise the same time-frequency resource unit in time domain and frequency domain.

In one embodiment, at least two radio resources of the N1 first-type radio resources belong to two spatial parameter groups in space domain, and belong to the same time-domain unit in time domain.

In one embodiment, at least two radio resources of the N1 first-type radio resources belong to two spatial parameter groups in space domain, and belong to the same frequency-domain unit in frequency domain.

In one embodiment, at least two radio resources of the N1 first-type radio resources belong to two spatial parameter groups in space domain, and comprise the same time-frequency resource unit in time domain and frequency domain.

In one embodiment, any two radio resources in the N1 first-type radio resources belong to two carriers in frequency domain, and belong to the same spatial parameter group in space domain.

In one embodiment, any two radio resources of the N1 first-type radio resources belong to two BWPs in frequency domain, and belong to the same spatial parameter group in space domain.

In one embodiment, any two radio resources in the N1 first-type radio resources respectively comprise two different time-frequency resource units, and belong to the same spatial parameter group in space domain.

In one embodiment, at least two radio resources in the N1 first-type radio resources belong to two carriers in frequency domain, and belong to the same spatial parameter group in space domain.

In one embodiment, at least two radio resources of the N1 first-type radio resources belong to two BWPs in frequency domain, and belong to the same spatial parameter group in space domain.

In one embodiment, at least two radio resources in the N1 first-type radio resources respectively comprise two different the different time-frequency resource units, and belong to the same spatial parameter group in space domain.

In one embodiment, the first spatial parameter group comprises a positive integer number of spatial parameter(s).

In one embodiment, the first spatial parameter group comprises only one spatial parameter.

In one embodiment, the first spatial parameter group comprises a positive integer number of antenna port group(s).

In one embodiment, any of the first spatial parameter group corresponds to one antenna port group.

In one embodiment, the first spatial parameter group comprises one antenna port group.

In one embodiment, any of the first spatial parameter group corresponds to one antenna port.

In one embodiment, the one spatial parameter group correspond to one antenna port.

In one embodiment, all spatial parameters in the first spatial parameter group correspond to one antenna port.

In one embodiment, the first radio signal is used for indicating the first spatial parameter group.

In one embodiment, the first radio signal is used for indicating the antenna port group corresponding to the first spatial parameter group.

In one embodiment, the first radio signal is used for indicating the antenna port comprised in the first spatial parameter group.

In one embodiment, the first radio signal is used for indicating the N1 spatial parameter group(s).

In one embodiment, the first radio signal is used for indicating an index of the first spatial parameter group in the N1 spatial parameter group(s).

In one embodiment, any of N2 second-type radio resource(s) belongs to a spatial parameter group in spatial domain, and each of the N2 second-type radio resource(s) respectively corresponds to N2 spatial parameter group(s), N2 being a positive integer.

In one embodiment, the second radio resource belongs to a second spatial parameter group in space domain, and the second spatial parameter group is one of the N2 spatial parameter group(s).

In one embodiment, the second spatial parameter group comprises a positive integer number of spatial parameter(s).

In one embodiment, the second spatial parameter group comprises only one spatial parameter.

In one embodiment, the second spatial parameter group comprises a positive integer number of antenna port group(s).

In one embodiment, any of the second spatial parameter group corresponds to one antenna port group.

In one embodiment, the second spatial parameter group comprises one antenna port group.

In one embodiment, any of the second spatial parameter group corresponds to one antenna port.

In one embodiment, the second spatial parameter group corresponds to one antenna port.

In one embodiment, all spatial parameters in the second spatial parameter group correspond to one antenna port.

In one embodiment, the first radio signal is used for indicating the second spatial parameter group.

In one embodiment, the first radio signal is used for indicating the antenna port group corresponding to the second spatial parameter group.

In one embodiment, the first radio signal is used for indicating the antenna port comprised in the second spatial parameter group.

In one embodiment, the first radio signal comprises the N2 spatial parameter group(s).

In one embodiment, the first radio signal is used for indicating an index of the second spatial parameter group in the N2 spatial parameter group(s).

Embodiment 13

Figure 13:
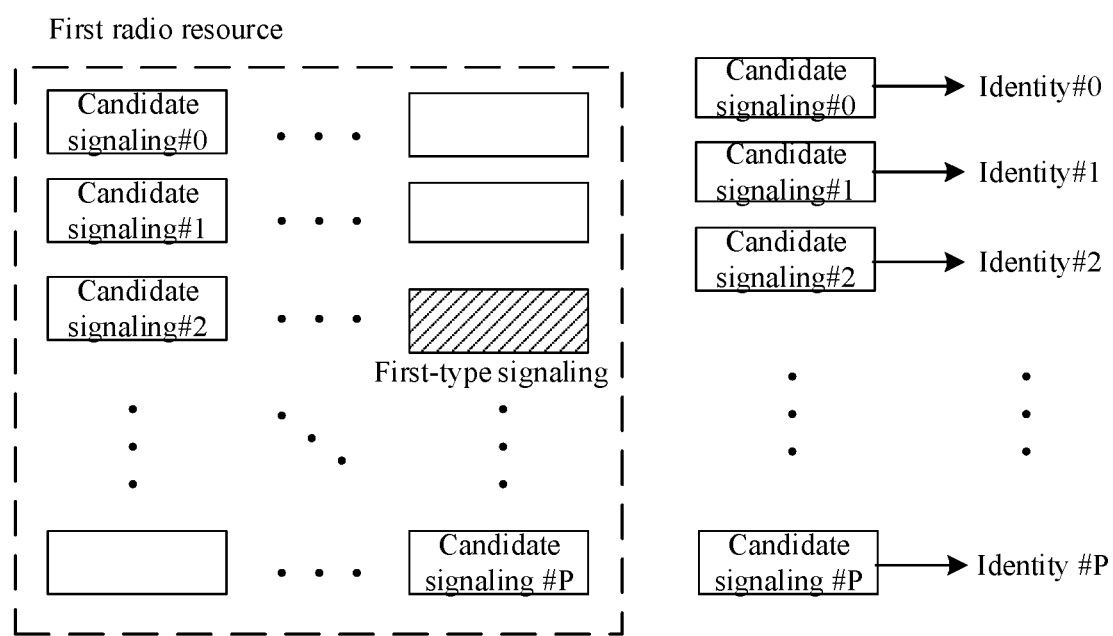
FIG. 13 illustrates a flowchart of a first-type signaling being directly associated with P candidate signalings according to one embodiment of the present disclosure.

Embodiment 13 illustrates a schematic diagram of a relationship between a first-type signaling and P candidate signalings according to one embodiment of the present disclosure, as shown in FIG. 13. In FIG. 13, the dot-framed rectangle represents a first radio resource in the present disclosure; each solid-line-framed rectangle represents one of P candidate signalings, and a slash-filled rectangle represents a first-type signaling in the present disclosure, P being a positive integer number greater than 1; each of the P candidate signalings respectively corresponds to P identities.

In Embodiment 13, the P candidate signalings are detected on the first radio resource, each of the P candidate signalings indicates that the first radio signal is correctly received, and each of the P candidate signalings respectively indicates the P identities; the first-type signaling is selected out of the P candidate signalings, and the selected first-type signaling is one of the P candidate signalings.

In one embodiment, when the first radio signal is correctly received by the first node, the selected first-type signaling indicates a second identity, the second-type signaling transmitted by the first node indicates a second identity, the second identity being one of the P identities.

In one embodiment, the first node determines the selected first-type signaling according to received power of the P candidate signalings.

In one embodiment, received power of the selected first-type signaling is the highest.

In one embodiment, received power of the selected first-type signaling exceeds a certain threshold.

In one embodiment, the first node determines the selected first-type signaling according to received power of P discovery signals, each of the P discovery signals respectively corresponds to the P candidate signalings, and any of the P discovery signals and its corresponding candidate signaling are transmitted by a same transmitter.

In one embodiment, the discovery signal comprises a synchronization signal.

In one embodiment, the discovery signal comprises a PSDCH.

In one embodiment, received power of a discovery signal corresponding to the selected first-type signaling is the highest.

In one embodiment, received power of a discovery signal corresponding to the selected first-type signaling exceeds a specific threshold.

Embodiment 14

Figure 14:
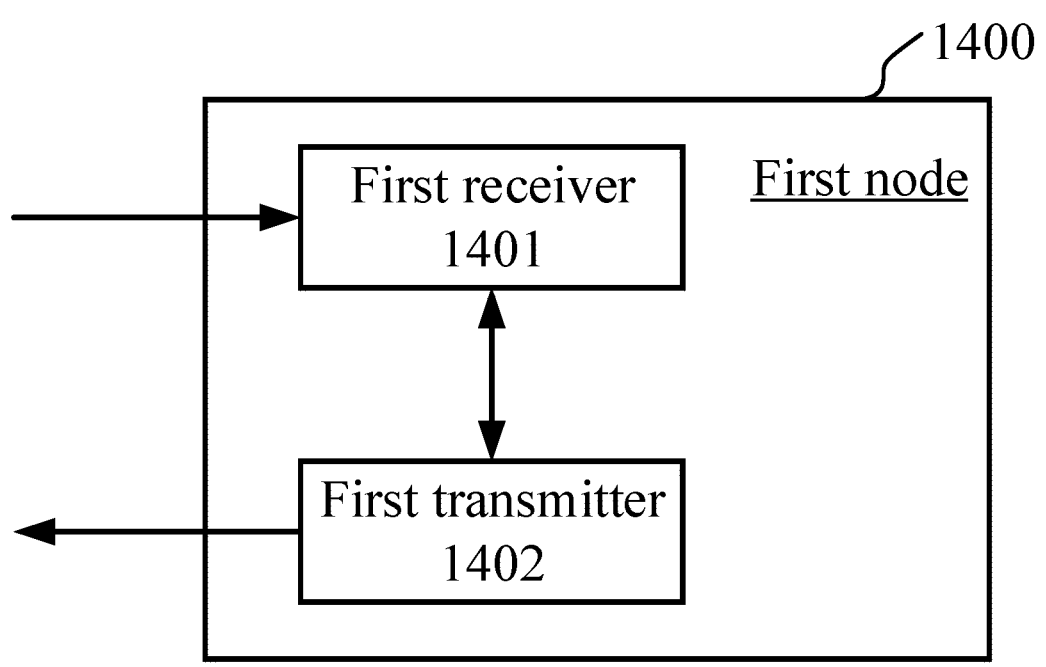
FIG. 14 illustrates a structure block diagram of a processing device in a first node according to one embodiment of the present disclosure.

Embodiment 14 illustrates a structure block diagram of a processing device used in a first node, as shown in FIG. 14. In Embodiment 14, a first node processing device 1400 mainly consists of a first receiver 1401 and a first transmitter 1402.

In one embodiment, the first receiver 1401 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In one embodiment, the first transmitter 1402 comprises at least one of an antenna 452, a transmitter/receiver 454, a multi-antenna transmitting processor 457, a transmitting processor 468, a controller/processor 459, a memory 460, or a data source 467 in FIG. 4 of the present disclosure.

In Embodiment 14, the first receiver 1401 receives a first radio signal; a first transmitter 1402 transmits a first-type signaling on a first radio resource, the first-type signaling being used for indicating that the first radio signal is correctly received; or, transmits a second-type signaling on a second radio resource, the second-type signaling is used for indicating that the first radio signal is not correctly received; and time-domain resources occupied by the first radio resource and time-domain resources occupied by the second radio resource are orthogonal.

In one embodiment, the first receiver 1401 monitors a second-type signaling on the second radio resource; the second-type signaling is detected by the first receiver 1401, and the first transmitter 1402 transmits a second radio signal on a third radio resource; or, the second-type signaling is not detected by the first receiver 1401, and the first transmitter 1402 drops transmission of a second radio signal on the third radio resource; herein, the first node transmits the first-type signaling on the first radio resource, a first bit block is used for generating the first radio signal, and the first bit block is used for generating the second radio signal.

In one embodiment, the first-type signaling transmitted by the first node is used for indicating the third radio resource.

In one embodiment, the second-type signaling comprises a first signature sequence.

In one embodiment, the first receiver 1401 monitors a first-type signaling on the first radio resource; the first receiver 1401 receives a third radio signal on a fourth radio resource; herein, the first node transmits the second-type signaling on the second radio resource, a first bit block is used for generating the first radio signal, and the first bit block is used for generating the third radio signal.

In one embodiment, the second-type signaling transmitted by the first node is used for indicating the fourth radio resource.

In one embodiment, the first receiver 1401 detects P candidate signalings on the first radio resource, each of the P candidate signalings indicates that the first radio signal is correctly received, and each of the P candidate signalings respectively indicates P identities, P being a positive integer greater than 1; the first receiver 1401 selects the first-type signaling out of the P candidate signalings, and the selected first-type signaling is one of the P candidate signalings; herein, the selected first-type signaling indicates a second identity, the second-type signaling transmitted by the first node indicates a second identity, the second identity being one of the P identities.

In one embodiment, the second-type signaling transmitted by the first node comprises an identity of a transmitter of the first radio signal.

In one embodiment, the first node is a UE.

In one embodiment, the first node is a relay node.

Embodiment 15

Figure 15:
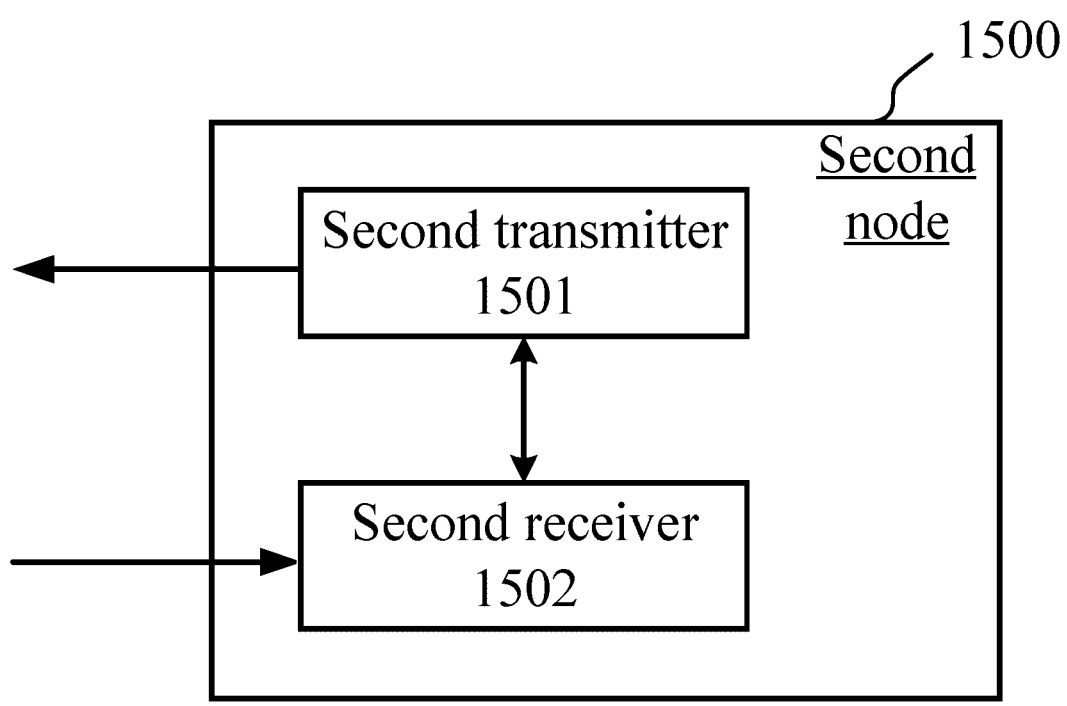
FIG. 15 illustrates a structure block diagram of a processing device in a second node according to one embodiment of the present disclosure.

Embodiment 15 illustrates a structure block diagram of a processing device used in a second node, as shown in FIG. 15. In FIG. 15, a second node processing device 1500 mainly consists of a second transmitter 1501 and a third receiver 1502.

In one embodiment, the second transmitter 1501 comprises at least one of an antenna 420, a transmitter/receiver 418, a multi-antenna transmitting processor 471, a transmitting processor 416, a controller/processor 475 or a memory 476 in FIG. 4 of the present disclosure.

In one embodiment, the second receiver 1502 comprises at least one of an antenna 420, a transmitter/receiver 418, a multi-antenna receiving processor 472, a receiving processor 470, a controller/processor 475 or a memory 476 in FIG. 4 of the present disclosure.

In Embodiment 15, the second transmitter 1501 transmits a first radio signal; the second receiver 1502 monitors a first-type signaling on a first radio resource, or, monitors a second-type signaling on a second radio resource; herein, the first-type signaling is used for indicating that the first radio signal is correctly received, and the second-type signaling is used for indicating that the first radio signal is not correctly received; and time-domain resources occupied by the first radio resource and time-domain resources occupied by the second radio resource are orthogonal.

In one embodiment, the second-type signaling is detected by the second receiver, and the second transmitter 1501 transmits a fourth radio signal on a fifth radio resource; or, the second-type signaling is not detected by the second receiver, and the second transmitter 1501 drops transmission of a fourth radio signal on the fifth radio resource; herein, a first bit block is used for generating the first radio signal, and the first bit block is used for generating the third radio signal.

In one embodiment, the first radio signal comprises first control information, the first control information indicating the fifth radio resource.

In one embodiment, the second-type signaling comprises a first signature sequence.

In one embodiment, the second-type signaling detected by the second node is used for indicating the fifth radio resource.

In one embodiment, the second receiver 1502 detects P candidate signalings on the first radio resource, each of the P candidate signalings indicates that the first radio signal is correctly received, and each of the P candidate signalings respectively indicates P identities, P being a positive integer greater than 1; the second receiver 1502 selects the first-type signaling out of the P candidate signalings, and the first-type signaling is one of the P candidate signalings; herein, the first-type signaling indicates a second identity, the second-type signaling monitored by the second node indicates a third identity, the third identity being one of the P identities.

In one embodiment, the second-type signaling detected by the second node comprises an identity of the second node, and the first-type signaling is not detected on the first radio resource.

In one embodiment, the second node is a UE.

In one embodiment, the second node is a relay node.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    receiving a first radio signal; and
    transmitting a first-type signaling on a first radio resource, the first-type signaling being used for indicating that the first radio signal is correctly received; or, transmitting a second-type signaling on a second radio resource, the second-type signaling being used for indicating that the first radio signal is not correctly received;
    wherein time-domain resources occupied by the first radio resource and time-domain resources occupied by the second radio resource are orthogonal.

2. The method according to claim 1, comprising:
    monitoring a second-type signaling on the second radio resource; and
    the second-type signaling being detected, transmitting a second radio signal on a third radio resource; or, the second-type signaling not being detected, dropping transmission of a second radio signal on the third radio resource;
    wherein the first node transmits the first-type signaling on the first radio resource, a first bit block is used for generating the first radio signal, and the first bit block is used for generating the second radio signal; the first-type signaling transmitted by the first node is used for indicating the third radio resource;
    or,
    monitoring a first-type signaling on the first radio resource; and
    receiving a third radio signal on a fourth radio resource;
    wherein the first node transmits the second-type signaling on the second radio resource, a first bit block is used for generating the first radio signal, and the first bit block is used for generating the third radio signal; the second-type signaling transmitted by the first node is used for indicating the fourth radio resource.

3. The method according to claim 1, wherein the second-type signaling comprises a first signature sequence.

4. A method in a second node for wireless communications, comprising:
    transmitting a first radio signal; and
    monitoring a first-type signaling on a first radio resource, or, monitoring a second-type signaling on a second radio resource;
    wherein the first-type signaling is used for indicating that the first radio signal is correctly received, and the second-type signaling is used for indicating that the first radio signal is not correctly received; time-domain resources occupied by the first radio resource and time-domain resources occupied by the second radio resource are orthogonal.

5. The method according to claim 4, comprising:
    the second-type signaling being detected, transmitting a fourth radio signal on a fifth radio resource; or, the second-type signaling not being detected, dropping transmission of a fourth radio signal on the fifth radio resource;
    wherein a first bit block is used for generating the first radio signal, and the first bit block is used for generating the third radio signal; the first radio signal comprises first control information, the first control information indicating the fifth radio resource.

6. A first node for wireless communications, comprising:
    a first receiver: receiving a first radio signal; and
    a first transmitter: transmitting a first-type signaling on a first radio resource, the first-type signaling being used for indicating that the first radio signal is correctly received; or, transmitting a second-type signaling on a second radio resource, the second-type signaling being used for indicating that the first radio signal is not correctly received;

wherein time-domain resources occupied by the first radio resource and time-domain resources occupied by the second radio resource are orthogonal.

7. The first node according to claim 6, wherein the second-type signaling comprises a first signature sequence.

8. The first node according to claim 6, comprising:
the first receiver, monitoring a second-type signaling on the second radio resource; and
the second-type signaling being detected, the first transmitter transmitting a second radio signal on a third radio resource; or, the second-type signaling not being detected, the first transmitter dropping transmission of a second radio signal on the third radio resource;
wherein the first node transmits the first-type signaling on the first radio resource, a first bit block is used for generating the first radio signal, and the first bit block is used for generating the second radio signal.

9. The first node according to claim 6, wherein the first-type signaling transmitted by the first node is used for indicating the third radio resource.

10. The first node according to claim 6, comprising:
the first receiver, monitoring a first-type signaling on the first radio resource; and
the first receiver, receiving a third radio signal on a fourth radio resource;
wherein the first node transmits the second-type signaling on the second radio resource, a first bit block is used for generating the first radio signal, and the first bit block is used for generating the third radio signal.

11. The first node according to claim 10, wherein the second-type signaling transmitted by the first node is used for indicating the fourth radio resource.

12. The first node according to claim 6, comprising:
the first receiver, detecting P candidate signalings on the first radio resource, each of the P candidate signalings indicating that the first radio signal is correctly received, and each of the P candidate signalings respectively indicating P identities, P being a positive integer greater than 1; and
selecting the first-type signaling out of the P candidate signalings, and the selected first-type signaling being one of the P candidate signalings;
wherein the selected first-type signaling indicates a second identity, the second-type signaling transmitted by the first node indicates a second identity, the second identity being one of the P identities.

13. The first node according to claim 6, wherein the second-type signaling transmitted by the first node comprises an identity of a transmitter of the first radio signal.

14. A second node for wireless communications, comprising:
a second transmitter: transmitting a first radio signal; and
a second receiver: monitoring a first-type signaling on a first radio resource, or, monitoring a second-type signaling on a second radio resource;
wherein the first-type signaling is used for indicating that the first radio signal is correctly received, and the second-type signaling is used for indicating that the first radio signal is not correctly received; time-domain resources occupied by the first radio resource and time-domain resources occupied by the second radio resource are orthogonal.

15. The second node according to claim 14, wherein the second-type signaling comprises a first signature sequence.

16. The second node according to claim 14, comprising:
the second-type signaling being detected, transmitting a fourth radio signal on a fifth radio resource; or, the second-type signaling not being detected, dropping transmission of a fourth radio signal on the fifth radio resource;
wherein a first bit block is used for generating the first radio signal, and the first bit block is used for generating the third radio signal.

17. The second node according to claim 16, wherein the first radio signal comprises first control information, the first control information indicating the fifth radio resource.

18. The second node according to claim 16, wherein the second-type signaling detected by the second node is used for indicating the fifth radio resource.

19. The second node according to any claim in claim 14, comprising:
detecting P candidate signalings on the first radio resource, each of the P candidate signalings indicating that the first radio signal is correctly received, and each of the P candidate signalings respectively indicating P identities, P being a positive integer greater than 1; and
selecting the first-type signaling out of the P candidate signalings, and the first-type signaling being one of the P candidate signalings;
wherein the first-type signaling indicates a second identity, the second-type signaling monitored by the second node indicates a third identity, the third identity being one of the P identities.

20. The second node according to any claim in the claim 14, wherein the second-type signaling detected by the second node comprises an identity of the second node, and the first-type signaling is not detected on the first radio resource.

* * * * *